(12) United States Patent
Rigopulos et al.

(10) Patent No.: US 9,704,350 B1
(45) Date of Patent: Jul. 11, 2017

(54) MUSICAL COMBAT GAME

(71) Applicant: Harmonix Music Systems, Inc., Cambridge, MA (US)

(72) Inventors: Alexander Rigopulos, Belmont, MA (US); Kasson D. Crooker, Arlington, MA (US); Matthew C. Boch, Somerville, MA (US); Matthew Perlot, Cambridge, MA (US)

(73) Assignee: HARMONIX MUSIC SYSTEMS, INC., Boston, MA (US)

( * ) Notice: Subject to any disclaimer, the term of this patent is extended or adjusted under 35 U.S.C. 154(b) by 0 days.

(21) Appl. No.: 13/831,224

(22) Filed: Mar. 14, 2013

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)
*A63F 9/02* (2006.01)

(52) U.S. Cl.
CPC ........ *G07F 17/3295* (2013.01); *A63F 9/0291* (2013.01)

(58) Field of Classification Search
CPC .... A63F 13/005; A63F 13/10; A63F 2300/10; A63F 2300/8047
USPC ...................................... 463/2, 35
See application file for complete search history.

(56) References Cited

U.S. PATENT DOCUMENTS

| | | |
|---|---|---|
| 4,655,113 A | 4/1987 | Bunger et al. |
| 5,256,832 A | 10/1993 | Miyake |
| 5,381,158 A | 1/1995 | Takahara et al. |
| 5,513,129 A | 4/1996 | Bolas et al. |
| 5,594,469 A | 1/1997 | Freeman et al. |
| 5,614,687 A | 3/1997 | Yamada et al. |
| 5,617,312 A | 4/1997 | Iura et al. |
| 5,993,318 A | 11/1999 | Kousaki |
| 6,002,808 A | 12/1999 | Freeman |
| 6,215,890 B1 | 4/2001 | Matsuo et al. |
| 6,285,351 B1 | 9/2001 | Chang et al. |

(Continued)

FOREIGN PATENT DOCUMENTS

| | | |
|---|---|---|
| CA | 2424673 A1 | 4/2002 |
| CN | 1218936 A | 6/1999 |

(Continued)

OTHER PUBLICATIONS

Gitaroo-Man (PlayStation 2) Review, Feb. 18, 2002 (Game Release Date), <http://www.honestgamers.com/4014/playstation-2/gitaroo-man/review.html>.*

(Continued)

*Primary Examiner* — Milap Shah
*Assistant Examiner* — Jason Pinheiro
(74) *Attorney, Agent, or Firm* — Wilmer Cutler Pickering Hale and Dorr LLP

(57) ABSTRACT

A computerized technique for use with a game console, the technique including providing, using the game console, a combat video game that includes a weapon, providing, using the game console and an audiovisual system, music as a player plays the video game, analyzing, using the game console, at least one of i) the music, and ii) metadata relating to the music, to determine a property, and controlling the operation of the weapon, using the game console, as a function of the property.

38 Claims, 35 Drawing Sheets
(31 of 35 Drawing Sheet(s) Filed in Color)

(56) References Cited

U.S. PATENT DOCUMENTS

| | | |
|---|---|---|
| 6,392,133 B1 | 5/2002 | Georges |
| 6,464,585 B1 | 10/2002 | Miyamoto et al. |
| 6,498,628 B2 | 12/2002 | Iwamura |
| 6,501,515 B1 | 12/2002 | Iwamura |
| 6,518,492 B2 | 2/2003 | Herberger et al. |
| 6,544,122 B2 | 4/2003 | Araki et al. |
| 6,599,195 B1 | 7/2003 | Araki et al. |
| 6,608,249 B2 | 8/2003 | Georges |
| 6,654,001 B1 | 11/2003 | Su |
| 6,699,123 B2 | 3/2004 | Matsuura et al. |
| 6,757,068 B2 | 6/2004 | Foxlin |
| 6,758,756 B1 | 7/2004 | Horigami et al. |
| 6,766,036 B1 | 7/2004 | Pryor |
| 6,921,336 B1 | 7/2005 | Best |
| 6,935,955 B1 | 8/2005 | Kaminkow et al. |
| 7,058,204 B2 | 6/2006 | Hildreth et al. |
| 7,071,001 B2 | 7/2006 | Brubaker |
| 7,096,079 B2 | 8/2006 | Matsuura et al. |
| 7,208,669 B2 | 4/2007 | Wells et al. |
| 7,289,645 B2 | 10/2007 | Yamamoto et al. |
| 7,301,548 B2 | 11/2007 | Zhang et al. |
| 7,369,685 B2 | 5/2008 | DeLean |
| 7,379,563 B2 | 5/2008 | Shamaie |
| 7,401,783 B2 | 7/2008 | Pryor |
| 7,421,093 B2 | 9/2008 | Hildreth et al. |
| 7,528,315 B2 | 5/2009 | Goodwin |
| 7,555,142 B2 | 6/2009 | Hildreth et al. |
| 7,598,942 B2 | 10/2009 | Underkoffler et al. |
| 7,618,322 B2 | 11/2009 | Shimizu et al. |
| 7,666,098 B2 | 2/2010 | Hecht et al. |
| 7,702,608 B1 | 4/2010 | Bererton et al. |
| 7,708,642 B2 | 5/2010 | Hecht et al. |
| 7,756,297 B2 | 7/2010 | Pryor |
| 7,767,897 B2 | 8/2010 | Jochelson et al. |
| 7,794,325 B2 | 9/2010 | Hawkins et al. |
| 7,812,815 B2 | 10/2010 | Banerjee et al. |
| 7,821,541 B2 | 10/2010 | Delean |
| 7,844,462 B2 | 11/2010 | Mayer-Ullmann |
| 7,849,421 B2 | 12/2010 | Yoo et al. |
| 7,887,403 B2 | 2/2011 | Kotani et al. |
| 7,923,621 B2 | 4/2011 | Shiraishi et al. |
| 7,933,431 B2 | 4/2011 | Pryor |
| 7,967,680 B2 | 6/2011 | Yamada et al. |
| 8,017,851 B2 | 9/2011 | Horovitz et al. |
| 8,076,565 B1 | 12/2011 | Bennett |
| 8,112,371 B1 | 2/2012 | Tu et al. |
| 8,131,015 B2 | 3/2012 | Hildreth et al. |
| 8,156,067 B1 | 4/2012 | Tu et al. |
| 8,194,924 B2 | 6/2012 | Pryor |
| 8,259,996 B2 | 9/2012 | Shamaie |
| 8,515,132 B2 | 8/2013 | Shamaie |
| 8,625,849 B2 | 1/2014 | Hildreth et al. |
| 2001/0016511 A1 | 8/2001 | Hino et al. |
| 2002/0068628 A1* | 6/2002 | Takatsuka ............ A63F 13/06 463/40 |
| 2002/0103023 A1 | 8/2002 | Matsuura et al. |
| 2007/0087798 A1 | 4/2007 | McGucken |
| 2007/0185909 A1 | 8/2007 | Klein et al. |
| 2007/0265097 A1 | 11/2007 | Havukainen |
| 2008/0227548 A1 | 9/2008 | Choudhry et al. |
| 2009/0036210 A1 | 2/2009 | Kotani |
| 2009/0075709 A1 | 3/2009 | Park |
| 2009/0231278 A1 | 9/2009 | St. Hilaire et al. |
| 2009/0278915 A1 | 11/2009 | Kramer et al. |
| 2009/0318223 A1 | 12/2009 | Langridge et al. |
| 2010/0053304 A1 | 3/2010 | Underkoffler et al. |
| 2010/0060570 A1 | 3/2010 | Underkoffler et al. |
| 2010/0060576 A1 | 3/2010 | Underkoffler et al. |
| 2010/0090946 A1 | 4/2010 | Underkoffler et al. |
| 2010/0090947 A1 | 4/2010 | Underkoffler et al. |
| 2011/0018803 A1 | 1/2011 | Underkoffler et al. |
| 2011/0025598 A1 | 2/2011 | Underkoffler et al. |
| 2011/0025603 A1 | 2/2011 | Underkoffler et al. |
| 2011/0044501 A1 | 2/2011 | Tu et al. |
| 2011/0077080 A1 | 3/2011 | Meer |
| 2011/0293144 A1 | 12/2011 | Rahardja et al. |
| 2012/0218181 A1 | 8/2012 | Pryor |
| 2013/0176206 A1 | 7/2013 | Pryor |
| 2013/0215014 A1 | 8/2013 | Pryor |

FOREIGN PATENT DOCUMENTS

| | | |
|---|---|---|
| CN | 1139893 C | 2/2004 |
| CN | 1499344 A | 5/2004 |
| CN | 1253776 C | 4/2006 |
| DE | 10349568 A1 | 5/2004 |
| EP | 905644 A2 | 3/1999 |
| EP | 992929 A2 | 4/2000 |
| JP | 2009011663 A | 1/2009 |
| JP | 4520490 B2 | 8/2010 |
| JP | 5-290699 B2 | 9/2013 |
| KR | 20040036593 A | 4/2004 |
| NZ | 525717 A | 11/2004 |
| WO | WO-0156007 A1 | 8/2001 |
| WO | WO-0229722 A2 | 4/2002 |
| WO | WO-2005031627 A1 | 4/2005 |
| WO | WO-2006081198 A2 | 8/2006 |
| WO | WO-2008112448 A1 | 9/2008 |
| WO | WO-2012123780 A1 | 9/2012 |

OTHER PUBLICATIONS

"Gitaroo Man Wikipedia Entry", Feb. 18, 2002 (Game Release Date), <http://en.wikipedia.org/w/index.php?title=Gitaroo_Man&printable=yes>.*

"Amplitude (Video Game) Wikipedia Entry", Mar. 24, 2003 (Game Release Date), <http://en.wikipedia.org/wiki/Amplitude_(video_game)>.*

"Gitaroo Man Wikipedia Entry", Apr. 2, 2012, <http://en.wikipedia.org/w/index.php?title=Gitaroo_Man&oldid=485221024>.*

"Amplitude (Video Game) Wikipedia Entry", Feb. 27, 2012, <http://en.wikipedia.org/w/index.php?title=Amplitude_(video_game)&oldid=479200183>.*

* cited by examiner

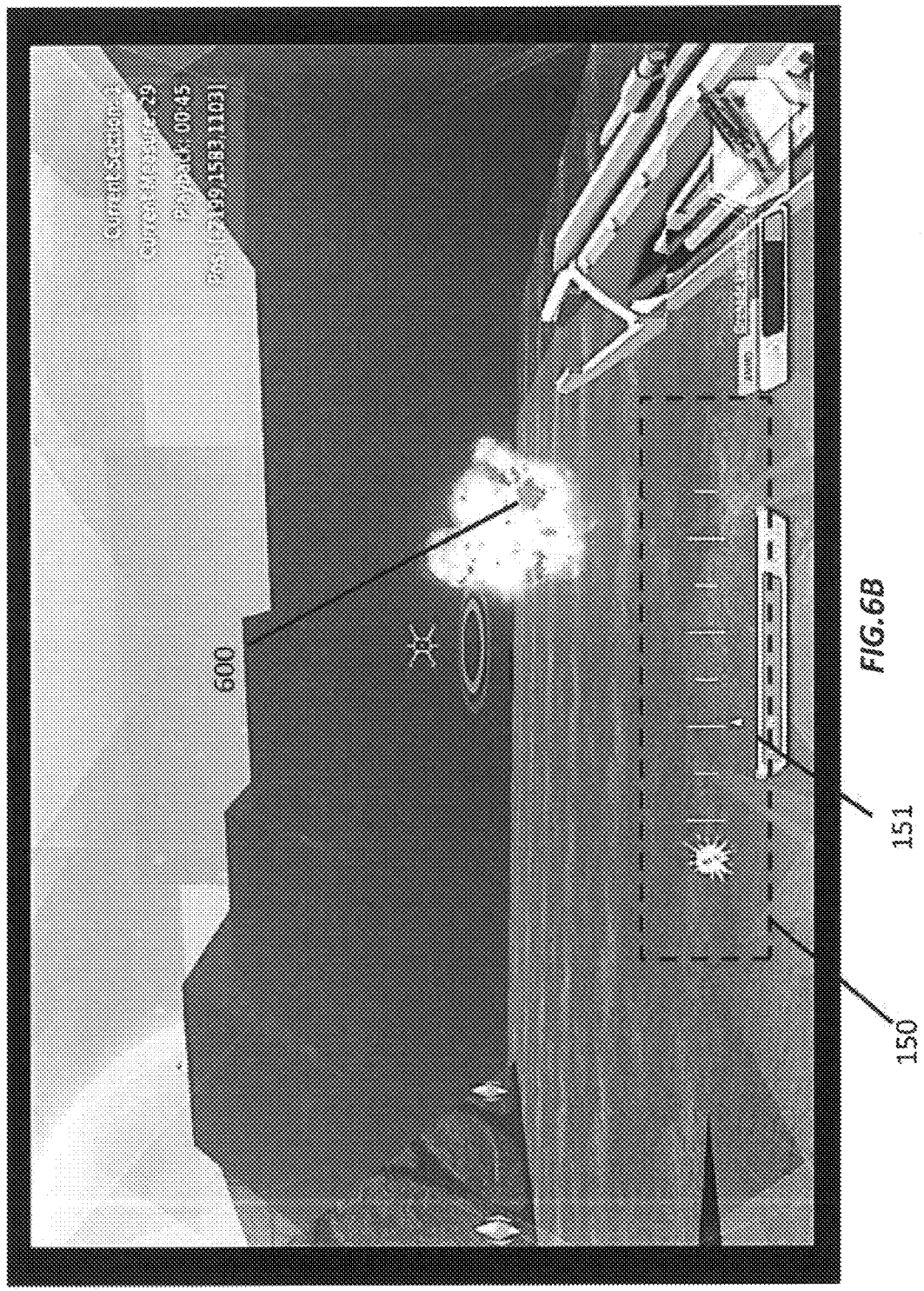

MUSICAL COMBAT GAME

BACKGROUND

Shooter type video games typically come in different variations including, for example, first-person shooter ("FPS") and third-person shooter ("3PS") variations.

In a first-person shooter ("FPS") game, an avatar moves around an arena of a virtual world to complete tasks and kill (also called "frag") adversaries. Players of the game can choose avatars to represent their character and typically see the virtual world in a first-person perspective. Players can move their character around the virtual world and shoot weapons. Since an FPS game is shown in a first-person perspective, players typically observe a shift in the background as their avatars move. Players can use weapons to shoot adversaries, killing or hurting them, while trying to avoid being killed themselves. Examples of FPS games are Wolfenstein, Call of Duty, Battlefield, Halo, Counter-Strike, and Quake.

Similar to an FPS game, there are other categories of shooter games, including a third-person shooter game (3PS). A third person shooter game is similar to an FPS game, but typically shows a virtual world from a third-person perspective. For example, a third-person shooter game can show a wider view of the environment. Sometimes, a third-person shooter game can even present an over-the-shoulder perspective of an avatar.

Some shooter games (e.g., FPS and 3PS games) can offer different play modes such as "deathmatch" and "capture the flag." Characters in an FPS game can be controlled by players and/or computers. Most of the newer games support a multiplayer mode, such that multiple players can select avatars and play in the same virtual world. Depending on the play mode, players can be allies with other players and fight against the other players.

SUMMARY

In general, in an aspect, embodiments of the disclosed subject matter can provide a non-transitory computer readable medium including computer readable instructions that, when executed by a computer, cause the computer to provide a combat video game that includes a weapon, provide music as a player plays the video game, analyze at least one of i) the music, and ii) metadata relating to the music, to determine a property, and control the operation of the weapon as a function of the property.

Embodiments of the disclosed subject matter can also provide one or more of the following features. Analyzing includes determining a trigger point, and controlling the operation of the weapon includes controlling the operation of the weapon as a function of the trigger point. Controlling the operation of the weapon includes controlling the operation of the weapon as a function of whether the player triggers the weapon at substantially the same time as the trigger point. Controlling the operation of the weapon includes modulating damage caused by the weapon as a function of how close a triggering time is to the trigger point. The non-transitory computer readable medium, wherein the instructions are further configured to cause the computer to provide a visual indicator to the player to indicate the timing of the trigger point. Analyzing includes determining a plurality of trigger points, and controlling the operation of the weapon includes controlling a projectile fired from the weapon as a function of whether the player performs a plurality of actions substantially synchronously with the trigger points. Controlling the operation of the weapon includes modifying a multiplier as a function of how many actions the player performs substantially synchronously with the trigger points. Analyzing includes determining the timing of a note in the music, and controlling the operation of the weapon includes controlling the operation of the weapon as a function of whether the player triggers the weapon at substantially the same time as the note. Controlling the operation of the weapon includes controlling at least one of the size, color, shape, and amount of damage of a projectile fired from the weapon as a function of the property. Analyzing includes determining a trigger point, and controlling the operation of the weapon includes detonating a projectile fired from the weapon at substantially the same time as the trigger point. Analyzing includes determining a tempo of the music, and controlling the operation of the weapon includes firing projectiles at a rate corresponding to the tempo of the music. Analyzing includes determining at least one of: tempo, triggering point timing, loudness, downbeat timing, pitch, frequency spectrum, timbre, and section boundary. Controlling the operation of the weapon as a function of the property includes controlling at least one of: rate of fire, range, intensity, power, reloading speed, damage path, splash zone radius, splash zone shape, amount of damage, and splash zone orientation.

In general, in another aspect, embodiments of the disclosed subject matter can provide a computerized method for use with a game console, the method including providing, using the game console, a combat video game that includes a weapon, providing, using the game console and an audiovisual system, music as a player plays the video game, analyzing, using the game console, at least one of i) the music, and ii) metadata relating to the music, to determine a property, and controlling the operation of the weapon, using the game console, as a function of the property.

Embodiments of the disclosed subject matter can also provide one or more of the following features. Analyzing includes determining a trigger point using the game console, controlling the operation of the weapon includes controlling the operation of the weapon as a function of the trigger point. Controlling the operation of the weapon includes controlling the operation of the weapon as a function of whether the player triggers the weapon at substantially the same time as the trigger point. Controlling the operation of the weapon includes modulating damage caused by the weapon as a function of how close a triggering time is to the trigger point. The computerized method further includes providing a visual indicator to the player to indicate the timing of the trigger point. Analyzing includes determining a plurality of trigger points, and controlling the operation of the weapon includes controlling a projectile fired from the weapon as a function of whether the player performs a plurality of actions substantially synchronously with the trigger points. Controlling the operation of the weapon includes modifying a multiplier as a function of how many actions the player performs substantially synchronously with the trigger points. Analyzing includes determining the timing of a note in the music using the game console, and controlling the operation of the weapon includes controlling the operation of the weapon as a function of whether the player triggers the weapon at substantially the same time as the note. Controlling the operation of the weapon includes controlling at least one of the size, color, shape, and amount of damage of a projectile fired from the weapon as a function of the property. Analyzing includes determining a trigger point, and controlling the operation of the weapon includes detonating a projectile fired from the weapon at substantially the same time as the trigger point. Analyzing includes determining a tempo of the music, and controlling the operation of the weapon includes firing projectiles at a rate corresponding to the tempo of the music. Analyzing includes determining at least one of: tempo, triggering point timing, loudness, downbeat timing, pitch, frequency spectrum, timbre, and section boundary. Controlling the operation of the weapon as a function of the property includes controlling at least one of: rate of fire, range, intensity, power, reloading speed, damage path, splash zone radius, splash zone shape, amount of damage, and splash zone orientation.

Various aspects of the disclosed subject matter can provide one or more of the following capabilities. User enjoyment of shooter games can be increased compared with prior techniques. Users can create music while playing a shooter game. User's interaction with the virtual world can be a function of the background music. Music can impose additional constraints to make the game more difficult. Users can get feedback of their actions in a musical form. The physics of the arena can be controlled as a function of the music.

These and other capabilities of the disclosed subject matter will be more fully understood after a review of the following figures, detailed description, and claims.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Embodiments of the disclosed subject matter can provide techniques for incorporating and/or intertwining music into a video game, such as a combat and/or shooter video game. For example, the background music can control how the player interacts with the virtual world. In this example, a player may only be able to fire a weapon on certain beats of the background music, some projectiles fired from the weapons may explode only on certain beats of the music, and/or some weapons may be stronger/weaker during certain parts of the music. Further, in this example, the virtual world can change based on the background music such as having a platform rise during a bridge of a song. In another aspect of the game, the player's actions can control the background music in the game. For example, by firing a weapon, the player can "paint" the virtual world with music and/or color. In this example, different weapons can "paint" the virtual world differently. The shooter game described herein can be one of many genres of game including, for example, military, science fiction, and/or post-apocalyptic. Other embodiments are within the scope of the disclosed subject matter.

While the description herein focuses on FPS- and 3PS-type shooter games, the techniques described herein can also apply to other types of video games such as massively multiplayer online first person shooter ("MMOFPS"), light gun shooter games, shoot 'em up (SHMUP) games, tactical shooter games, fixed shooter, tube shooter, scrolling shooter, bullet hell, cute 'em up, run and gun, rail shooter games, and Robotron-like shooter games. The techniques can also apply to non-shooter type video games.

Figure 1:
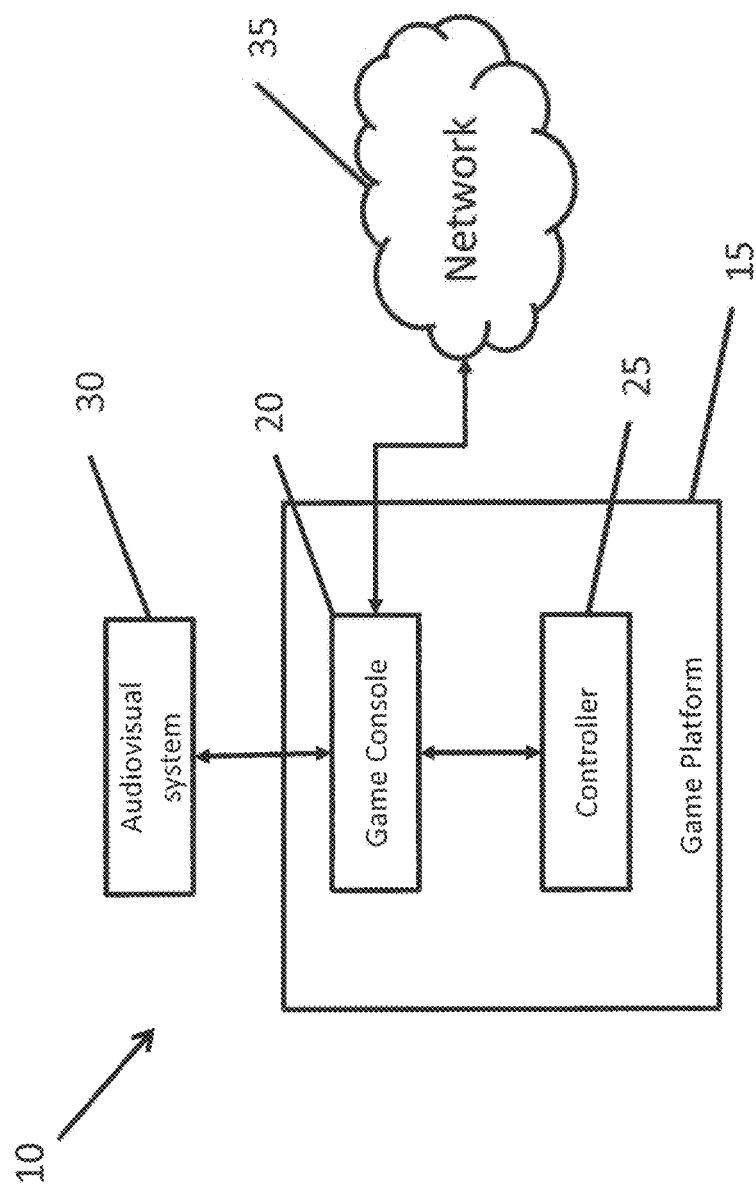
FIG. 1 includes a block diagram of an exemplary gaming system.

Referring to FIG. 1, a system 10 includes a game platform 15 that can be used to play the game described herein. The game platform can include a game console 20 that is configured to be coupled to at least one controller 25. The game console 20 can be coupled to an audiovisual system 30, such as a display, speaker, and/or amplifier. The audiovisual system 30 can be separate devices for presenting audio and video, or it can be a combined device, such as a television. The game console 20 can also be coupled to a network 35 such as a LAN, WAN, or the Internet via a hardwired and/or wireless connection. The game console 20 can be configured to connect to other game consoles and/or servers via the network 35. The game console 20 can be, for example, a MICROSOFT XBOX, SONY PLAYSTATION, a PC, and/or a mobile device (e.g., an IPAD, IPHONE, etc.). The controller 25 can be, for example, an XBOX controller, a KINECT camera controller system, a SONY PLAYSTATION controller, a PC joystick, a mouse, a keyboard, and/or a touchscreen interface. The controller 25 can also be a sensor that detects movements and/or positions of users such as a two-dimensional and/or three-dimensional camera system that tracks the position of a player in two-dimensional and/or three-dimensional space. A further description of a camera-based controller system can be found in U.S. patent application Ser. No. 13/250,322, filed on Sep. 30, 2011, which is incorporated by reference herein in its entirety. The game console 20 can be configured to read CDs and/or DVDs that video games are typically packaged on. Additionally, the game console 20 can be configured to download video games via the network 35. The game console 20 can also include in an input mechanism and/or input port for receiving an audio input (e.g., an input to connect to and receive music from an IPOD). Other embodiments of the system 10 are possible. The game system 10 can be configured to carry out all of the functionality described herein.

Figure 2:
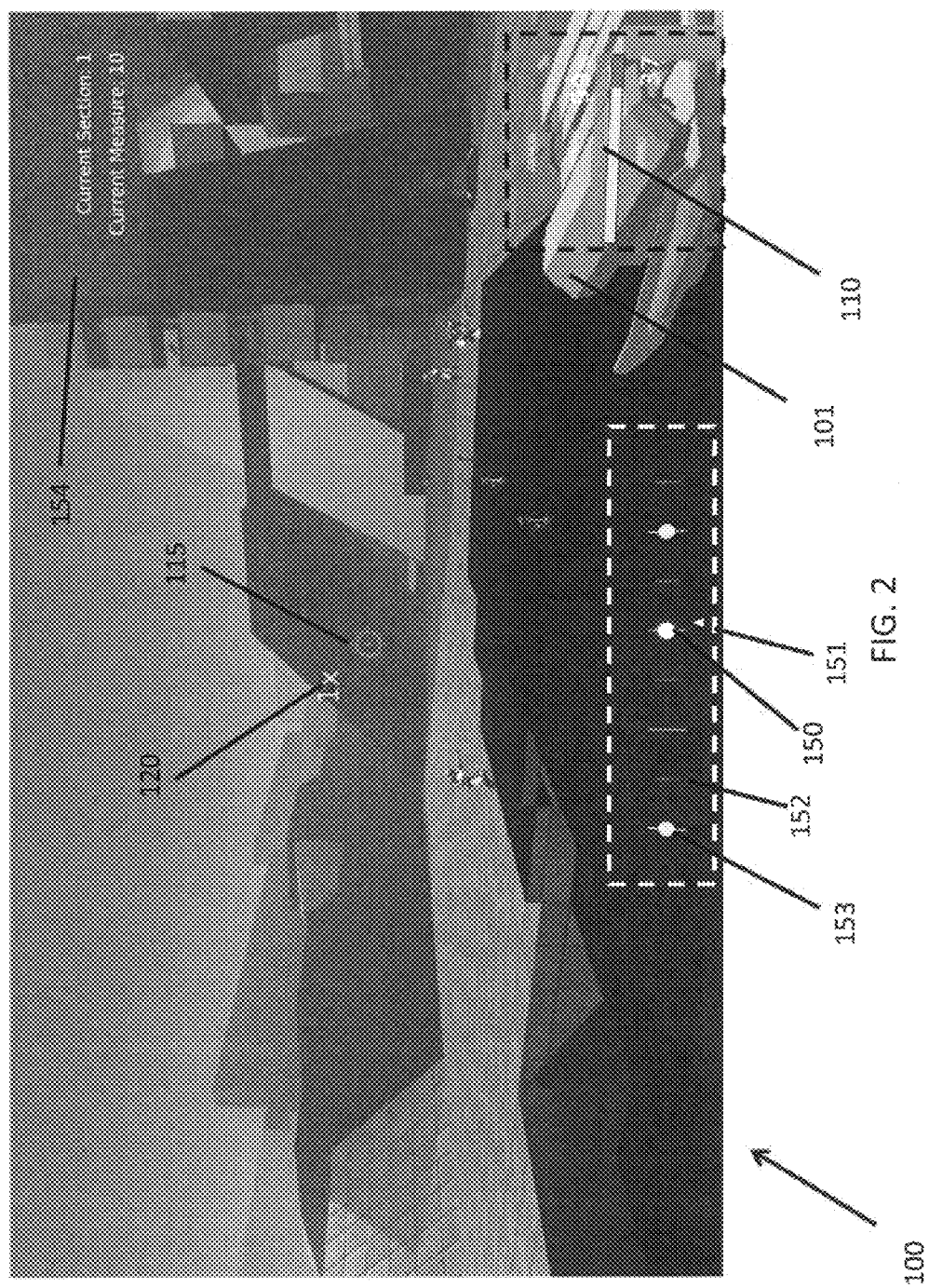
FIG. 2 is a screen shot of an exemplary virtual world.

Referring to FIG. 2, a view 100 illustrates an exemplary virtual world of a shooter game that can be displayed to a player. The view 100 is first-person perspective, as if the user is viewing the world via a character's (e.g., protagonist's) eyes. View 100 shows the landscape of the virtual world. A status indicator 110 shows respective statuses of the character's health, armor, and ammo. A weapon 101 is shown on the bottom right corner. Preferably, a player can see which weapon their character is currently using by looking at the weapon 101. While the view is shown as being from the first-person perspective, the view 100 can also be in a third-person perspective (e.g., where the character's avatar is visible). The view 100 can also include a crosshair 115 (also called a reticle) indicating where the player's weapon will fire and a damage multiplier 120 that indicates a multiplier that would be applied to the weapon if it is fired correctly (e.g., subject to the firing constraints discussed herein). The multiplier can relate to, for example, the damage caused by the weapon, the range of the weapon, the splash zone, etc.

The weapon 101 can include many different types of weapons such as automatic weapons, melee weapons, beam weapons, and manual weapons. Specific examples of weapons can include knives, chainsaws, bludgeoning weapons, pipes, baseball bats, a lasso d'amore, pistols, revolvers, shotguns, super shotguns, nailguns, chain guns, lightning guns, assault rifles, submachine guns, light rifles, machine guns, grenades, grenade launchers, mines, demolition packs, marksman guns, crossbows, sniper rifles, rail guns, gauss rifles, rocket launchers, flamethrowers, minion launchers, harpoons, plasma guns, energy guns, BFGs, tether guns, Dub cannons, lasers, photon torpedoes, phasers, plasma rifles, cannons, bazookas, and sentry guns. Each of these weapons can interact with and/or create background music differently from one another. For example, a BFG may only be able to fire on the start of a chorus, whereas a pistol can fire on any beat.

Typically each weapon has a damage path that defines the path a projectile takes as it is fired from the weapon. As used herein, a projectile is not limited to an object of finite mass but can also include non-tangible massless items such as waves (e.g., sound, energy, light, etc.). Typical damage paths are damage lines, damage cones, and dynamic damage paths (e.g., damage paths that can dynamically vary based on a variable). For example, the shape of dynamic damage paths can vary based on the music being played (as described below). The appearance of a damage line can also vary depending on the speed of the projectile. For example, plasma fired from a plasma gun can appear like water coming out of a hose (e.g., where if you move the hose to the side, the stream that has already been emitted continues in the direction it was going), whereas light coming from a light rifle can appear like light emitted from a flashlight (e.g., where the light appears to move instantaneously with the movement of the flashlight). The speed of the projectiles from the weapons can vary depending on the weapon type. For example, a player may be able to see a rocket gradually travel away from the rocket launcher, but a light beam from a light rifle can appear instantaneously as if it were traveling at the speed of light. As another example, the visualization applied to a beam projectile can propagate the entire length of the beam instantaneously, or can propagate gradually.

In some embodiments of the game, music can be provided to a player as the player navigates through the virtual world. The game console 20 can provide the music using, for example, an audio system that is part of the display 30. Music to be incorporated into the shooter game can be provided in several manners. For example, music can be provided along with the game (e.g., on the same CD/DVD as the game itself), music can be downloaded from a remote server via the network 35, and/or a user can provide music using, for example, an IPOD plugged into the game console 20.

In embodiments including music, the game can also provide indicators that provide visual feedback and/or cues relating to the music, such those described below with respect to FIGS. 3A-3C and 4. For example, the linear cue indicator 150 can provide visual feedback that allows a user to pull a trigger at the right time based on the music. The view 100 can also include a portion 154 that provides information about the music, such as the current section, current measure, the number of beats per minute, time elapsed in a section, time remaining in a section, time elapsed in a match, and/or time remaining in match.

In embodiments including music, the game typically uses metadata relating to the background music. The metadata can describe properties of the music, and/or can be directly or indirectly derived from the music. For example, the metadata can provide information relating to the following musical properties and/or musically significant events: timing of beats, timing of musically significant events (e.g., bridges, choruses, intros, outros, verses, chord changes, etc.), tonality, timing of notes, loudness, downbeat timing, pitch, frequency, frequency spectrum, timbre, envelope, tempo, time signature, rhythmic motif, timing of played notes, envelope, instrumentation, orchestration, arrangement, presence and pitch of specific instruments including human voices, song form (e.g., 12 bar blues, 32-bar ballad form, etc.) genre, sub-genre. The metadata can be predefined (e.g., authored) and can be provided along with the music track. For example, if the machine code for the game is provided on a computer readable medium such as a DVD, the music and corresponding metadata can be included on the same DVD. In some embodiments, the game console can also determine the metadata in real-time by analyzing the music using, for example, beat detection algorithms, tempo analysis, pitch analysis, frequency analysis, tonality analysis, genre analysis, sound intensity analysis, timing analysis, instrumentation analysis, orchestration analysis, arrangement analysis, notes analysis, etc. In some embodiments, the player can supply a song, and the game platform can fetch corresponding metadata information for that song from a remote server. In still other embodiments, a player can select and download a song from a remote server, along with the corresponding metadata (which can come from the same or different remote server). The metadata can be used by the game to, for example control, constrain, and/or otherwise affect gameplay. For example, the game console can use the metadata to generate the features of the linear cue indicator 150. The metadata can also include a programmed rhythmic pattern that is unrelated to any properties of the music itself. In still other embodiments, the metadata can also include a programmed rhythmic pattern that is determined directly or indirectly based on music (e.g., hand-composed rhythmic patterns that complement the music).

The game can include first-order mechanics. In the first-order mechanics, music can control, constrain, and/or otherwise affect the operation of weapons as a function of the musical properties of music used with the game. The game can adjust the operation of weapons based on the musical properties of the portion of the music that is active during the game session. Non-limiting examples of how the music can affect the operation of the weapons are described below.

The music can affect the weapon's efficacy such that it is a function of the properties of the music. For example, the following features of a weapon can vary as a function of the properties of music: damage capabilities, damage multipliers, blast radius, blast shape, blast orientation, amount of damage, rate of fire, ranges, areas of effect, splash zone size, splash zone shape, and splash zone orientation. Specific examples of this are as follows. During a faster and/or louder portion of the music, a weapon can inflict more damage to other players. A faster and louder portion of the music can increase the shooting range of a weapon. A speed of a projectile from a weapon can increase or decrease based on the background music. The weapons can also have a bigger area of effect, called a splash zone or a damage cone. Projectiles can fire in in accordance with the beat of the music such that in a section of music with a really fast beat, the weapon can fire very quickly, in time with the beat of the music. The rate of fire of a weapon can vary dynamically as the tempo of the music changes, and/or the speed of notes changes.

The music can affect a projectile once it is launched from a weapon. For example, explosive weapons and/or projectiles can explode at a scripted note (e.g., a beat or a downbeat). An explosion can be made especially powerful when the scripted note is a rare event. For example, at a section change downbeat, the explosion can have a much greater area of effect and power than it would have on an ordinary downbeat. The color, shape, size, intensity, and/or volume of the projectiles can vary as a function of the music.

The aesthetic properties of the weapons can also vary as a function of the properties of the background music. At an abstract level, this can be thought of as synesthesia where a player can see visual effects that correspond to what they are hearing at the same time. For example, projectiles and other objects in the virtual world can be animated and/or visualized based on the musical properties of the music. The animation can be rendered by the game in real-time, and can be synchronized with the music. The aesthetic properties of the music can include single effects, or a plurality of composited effects.

Visual effects (e.g., look and feel) of weapons and their projectiles can change based on the music. For example, the color and size of projectiles (e.g., rockets, light beams, plasma streams, etc.) can be controlled by the musical soundtrack. For example, the tempo can control the size of the plasma stream, the loudness can control the stream width, the note pitch can control the stream color, and the register can control the brightness/saturation. Projectiles can pulse with the beat of the music. Light waves and/or sparkler effects can emanate from a projectile and can be visualized as a function of the music. These aesthetics can be configured to have no functional effects or be correlated to the effectiveness of the weapon. For example, the change in size or shape of the plasma stream can change the potential damage or range of the weapon. The visualization applied to projectiles can depend on the type of weapon. For example, a visualization can be localized on a rocket as it moves away from the weapon, whereas a visualization of a plasma stream can instantaneously propagate the entire length of the plasma stream. Visual effects emanating from a weapon can also be distinct from a projectile fired from the weapon (e.g., the visualization does not have to be tied to the projectile itself). For example, a pistol can fire a bullet and a separate visualization can emanate from the pistol.

There can be other game environments that are affected by the music. For example, spawn locations and times (e.g., where and when weapons, health packs, and armor emerge for player pickup and/or where players who have been killed are re-spawned) can be controlled by the music. The system can be configured such that a special weapon with extraordinary strength (e.g., a BFG) appears at a certain section of a song. The physics of the virtual world can also be a function of the music. For example, a plasma gun stream can be fired through a glass wall during certain parts of a song. Gravity can be tied to the properties of the music. The music can affect the speed at which a player regains health. Health and armor degeneration can vary depending on the properties of the background music. For example, during faster parts of a song, a player can suffer less injury when jumping off a high platform.

Some weapons can have a recharge period, which is typically a period that a player needs to wait for the weapon to recharge and/or reload before a subsequent shot is permitted and/or triggered. The recharge period can be determined as a function of the properties of the music. For example, the recharge period can be reduced or extended based on the music. As another example, the recharge period can be shorter when the tempo of the music is fast and can be longer when the tempo is slow. Weapons can also be recharged if the player performs continuous pattern triggering in accordance with musically significant events and/or trigger points.

The operation of weapons can be constrained and/or limited by the properties of the music as described in the following examples.

For example, the game can use trigger points, which are times when a player can do something (e.g., fire a weapon, detonate a grenade, inflict after-damage, open a door, arm a weapon such as a mine, etc.). The trigger points can be part of a pattern (e.g., a temporal pattern) that repeats for a portion of the music, although this is not required. The timing of trigger points can also be a function of the timing of musically significant events such as a beat, downbeat, trill, fill, etc. In some embodiments, the timing of trigger points correspond with notes and/or beats in the music, but this is not required and trigger points can even be set off the beats, or independent of the music itself, if desired. For example, the trigger points can be in the same place for every repetition, but not quantized to a beat or sub-beat. In some embodiments, the trigger points can be considered times when a player can fire (or, for some weapons, beat-match to inflict after-damage or charge up a weapon).

As another example, automatic weapons can have a rhythmic firing. In this example, the number of projectiles filed in a time interval can be a function of the number of beats, notes, and/or trigger points during the same time interval. Some weapons can be fired only when a user pulls a trigger synchronously with a trigger point and/or musically significant event such as a beat, downbeat, trill, fill, and/or in synchrony with a rhythmic pattern. The timing for the beats, trills, fills, or rhythmic patterns can be obtained from the metadata and/or can be indicated to the player using various visual cues. Additionally, some weapons can be fired at any time, but the weapons can be especially powerful when the player pulls the trigger at the same time as a musically significant event such as a beat, note, downbeat, trill, fill, or in synchrony with the rhythmic pattern and/or trigger point. As another example, the power of a weapon can be function of the difference in time between the user pulling the trigger and the time of a musically significant event and/or trigger point (e.g., if the time difference is small, the power of the weapon can be greater).

The game can provide rewards for a combo or streak. For example, if a user pulls the trigger according to the provided cues more than a predefined number of consecutive times, the efficacy of weapons can increase. The game can continue to increase the efficacy of the weapon up to a limit as the user correctly pulls the trigger. For example, if the user successfully pulls the trigger on five successive downbeats and/or trigger points, a multiplier can be applied to the maximum damage of the weapon up to a cap of 3×. The multiplier can also be applied when the user pulls the trigger on five non-consecutive musically significant events and/or trigger points.

For some weapons, continuous repetitive triggering by the player that is in synchrony with the music can increase the probability of hitting the target. For example, continuous triggering simultaneously with musically significant events and/or trigger points can increase the velocity of ammunition. This can make it easier for the shooter to hit the target or make it harder for the opponents to dodge the bullet. For some weapons, continuous triggering simultaneously with musically significant events and/or trigger points can allow its projectiles follow and/or track the target or increase the likelihood of following the target (e.g., by improving the turning radius of a projectile). For example, if a player launches a rocket, the player can repeatedly pull the trigger in synchrony with musically significant events and/or trigger points after it is fired to maintain the "lock" on the target so that the rocket continues to track the target. As used herein, "synchrony," "synchronous" and similar words can include the use of, for example, a slop window).

Some weapons can have after-effects (e.g., additional damages after the first hit). For example, the subsequent pulling of the trigger at trigger points can increase the damage of after-effects or the duration of after-effects. These subsequent pulls can be designed to be made in synchrony with the background music or cues of authored music. The game can be configured such that there is no after-effect if the first subsequent pull is not made.

Some weapons can fire projectiles that can penetrate objects as a function of the properties of the music. For example, a rocket can be configured such that it can penetrate solid objects in the virtual world on downbeats. Some weapons can be configured so that they interact with the virtual world in specific ways (e.g., light rifles can be configured to always pass through transparent materials and/or be reflected by mirrored surfaces).

The game can use a "slop window" to determine if a player pulls the trigger at the appropriate time (e.g., at the same time as a downbeat). The slop window can exist for each cue, and if the player pulls the trigger within the slop window, the trigger can be recognized as a successful trigger. An example of this is if the player pulls the trigger within ±100 ms of the actual beat. Typically, the slop window can be used to correct for a player's inability to pull the trigger exactly in synchrony with the music for various reasons. There can be delay in signal transfer from the game console to the audio system and from the input system to the game console. Also, there can be human cognitive limitations. Also, varying the length of the slop window can change the difficulty of the game. An example of the slop window spans from 100 ms before the correct timing to 100 ms after the timing.

Some example characteristics of specific weapons are illustrated below. This list, however, is exemplary only as there are a large number of permutations of characteristics that can be applied to each weapon. Any of the features identified below with respect to a specific weapon can be used with other weapons as well.

A pistol can be configured such that it can only be fired in synchrony with the trigger points and/or beats or notes of a prescribed rhythmic pattern of the music and/or a pattern specified in the metadata. The damage multiplier can increase as a player successfully fires at trigger points and/or musically significant events. The efficacy, speed, and/or range of the bullets fired from the pistol can be a function of the musical properties. Typically, the pistol has a damage line that extends coaxially outward from a barrel of the pistol. The pistol can be configured to fire ordinary bullets.

A rocket launcher can be configured such that a player can lock on a target before firing and then shoot at any time. Continuous pattern triggering (e.g., pulling the trigger according to a pattern that is a function of musically significant events and/or trigger points) after firing the rocket can increase the velocity of the rocket, and/or improve the turning radius of the rocket as it tracks its target, thus, increasing the likelihood of hitting the target. Typically, the rocket launcher as a dynamic damage path such that the rocket tracks the target after it is fired. The rocket launcher can also be configured such that the automatic tracking of a target only occurs while the player continues to press the trigger button after the projectile is fired.

Figure 3:
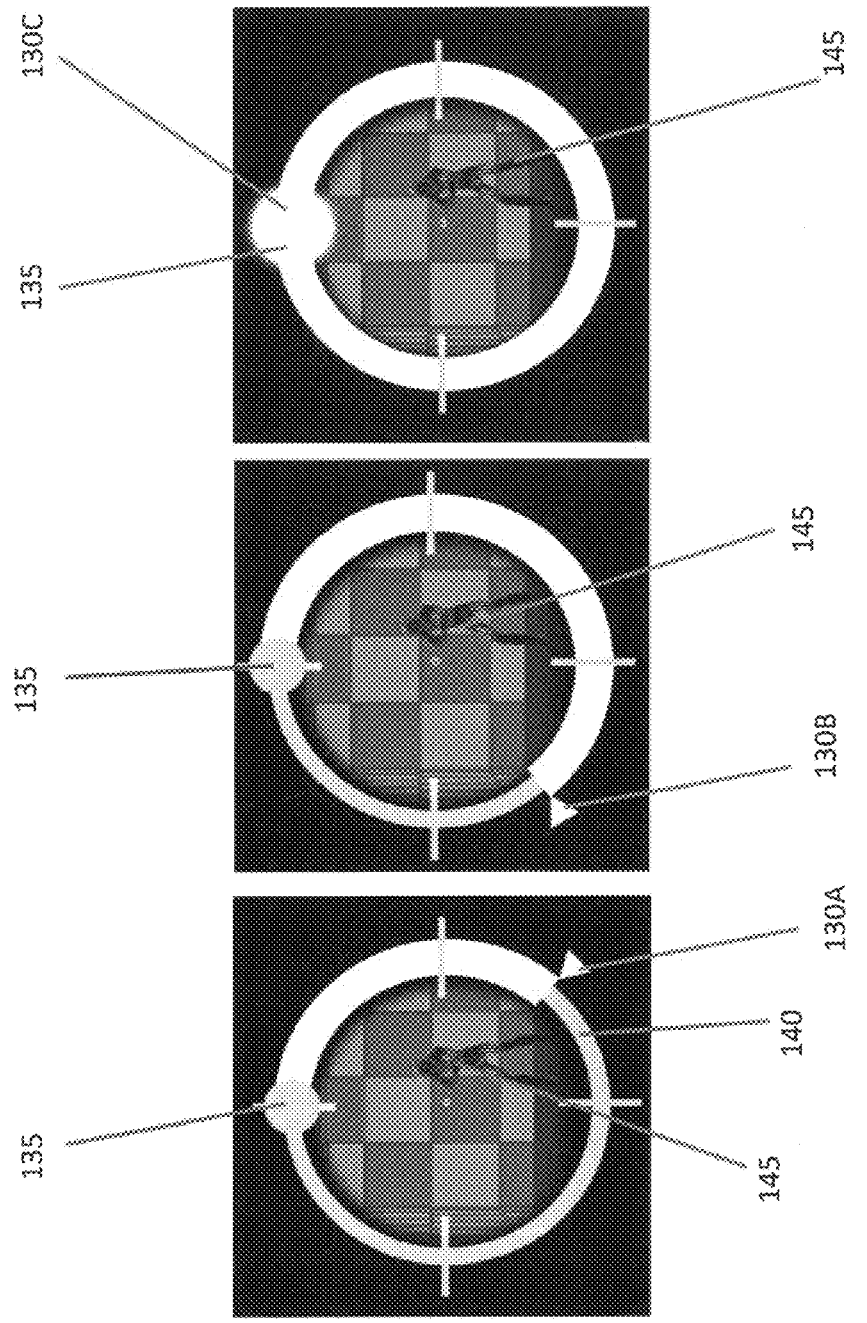
FIGS. 3A-3C are exemplary screen shots of a view through a rifle scope.

A sniper rifle can be functionally similar to pistol. For example, it can be configured such that it can fire at (or within a specified time range of) specific prescribed points in time (e.g., trigger points and/or musically significant events). While it can be harder to hit an enemy with a sniper rifle, the damage can be greater than that caused by the pistol. The sniper rifle can be combined with a circular visual indicator that circumferentially rings a scope of the sniper rifle (e.g., as shown in FIGS. 3A-3C). The damage caused by the sniper rifle can be modulated based on how closely it was triggered in relation to a musically significant event and/or triggering point. For example, the damage can increase as the amount of time between the musically significant event and/or triggering point decreases. The modulation can be linear or non-linear (e.g., the damage can drop to a fixed low damage amount outside of a given range). Typically, the sniper rifle has a damage line that extends coaxially outward from a barrel of the sniper rifle.

A shotgun can have a damage cone that disperses as a function the distance from the shotgun. Because of the shape of the damage cone, it can be easier to hit a target, but the effective range can be shorter. The shotgun can be configured so that it only fires on certain musically significant events and such that reloading of the shotgun can be a function of the music (e.g., reloading can occur more quickly during a chorus in the background music).

A plasma gun can produce a continuous stream of plasma. The strength and range of plasma gun can change based on the musical elements. The plasma gun typically has a damage line that extends coaxially outward from a barrel. Typically, once plasma is emitted from the gun, it continues on its original damage path, irrespective of how the plasma gun is moved. The color, shape, and size of the plasma can vary as a function of the musical properties. The plasma can stick to objects in the virtual world. For example, a player can paint the virtual world by firing plasma on the objects therein. Plasma stuck to the virtual objects can continue to radiate, for example, colors as a function of the music as it is stuck to the virtual object. If plasma sticks to an enemy, it can continue to hurt the player after the initial contact.

Minion launchers can release minions that can scramble off and attack enemies. The number and strength of minions can be a function of the properties of the background music. For example, more minions can appear when the background music has a faster tempo and/or when they are released on (or near) musically significant events and/or trigger points. Minions can also be controlled after release by for example, continuous pattern triggering with musically significant events and/or trigger points. Minions can also be controlled independently by the player using, for example, the controller.

Grenade launchers can launch grenades that explode as a function of the beat of the background music. For example, when a user pulls the trigger, the grenade launcher can release a grenade. The grenade can explode on a downbeat. The grenade can be especially explosive when the downbeat is a section change downbeat. The grenade launcher can also be configured to fire when the player pulls the trigger, but the grenade does not arm itself until the player releases the trigger, after which point the grenade can detonate on a musically significant event and/or trigger point.

A harpoon gun can be fired at any time or only at a prescribed beat. When a user successfully shoots the weapon and hits a target, the harpoon can create a tether between the gun and the target. The tether can inflict additional damage as the user continues to pull the trigger rhythmically. The tether can be broken if the line of sight between the player and target is broken. For example, the harpoon gun can inflict after-damage on another player based on continuous pattern triggering with musically significant events and/or trigger points.

A light rifle can fire a light projectile (e.g., similar to a laser beam). The light rifle can be an automatic weapon having a damage path that is coaxial with the barrel. The damage path can be affected by the music (e.g., a larger damage path when the music envelope is larger and/or the pitch of the music is higher).

In addition to offensive weapons, defensive armors and/or shields can also work as a function of the musical properties of the music. For example, a player can use armor that has properties that depend on the properties of the music. Armor and/or shields can have rhythmic patterns associated with them. In this example, a shield could protect a player at all times except on a downbeat. A shield with a particular rhythmic pattern can make weapons with the same rhythmic pattern ineffective. The canceling effect of a shield can be a linear function (e.g., increasing steadily) or a step function of how close the two rhythmic patterns match. The rhythmic pattern of armor and/or a shield can be tuned to better protect the player. A well-tuned shield can have higher cancelling effect and, in some cases, can reflect projectiles back to the opponent who fired the weapon. The tuning can take place in many forms. For example, a player can tune and lock a shield to a different pattern if the player repeats a rhythmic pattern within a threshold of accuracy a certain number of times. Additionally, the player can control the tuning using buttons on a controller. While the foregoing paragraph describes tuning with respect to defensive tools, the foregoing features can also apply to any of the offensive weapons described herein.

In another example, armor and/or a shield can have a frequency component associated with it. The frequency component can allow/prevent projectiles from hurting the player as a function of whether a frequency corresponding to the projectile matches the frequency of the armor or shield. For example, players can "tune" their weapons and shields to have corresponding musical properties (e.g., pitch, frequency, etc.). As a specific example, a pistol tuned to generate a C♯ when it fires can penetrate a shield that is tuned to C♯, whereas it would not penetrate the shield if the shield were tuned to B♭. In some embodiments, a shield can be effective if it is tuned to a specific interval above or below the weapon (e.g., if the shield is tuned a perfect fifth above the weapon.).

The game can also include second-order mechanics. The second order mechanics can allow the music to control, govern, and/or affect other game environments. This can enhance the game play experience as the player not only has to learn a virtual world, but also has to learn the music (e.g., the player can learn how the virtual world changes over time with the background music) in order to use the most effective weapons in the most effective matter during gameplay. Examples of these game environments are features and terrain in the virtual world. The music can cause changes to these features. Several examples follow.

The size, shape, position, and/or existence of features and/or terrain can change based on the music as described in the following non-limiting examples.

Features in the virtual world can change and/or be operated based on the music. For example, elevators, platforms, doors, lifts, etc. can operate as a function of the music (e.g., a platform can rise into the air during a chorus). Walls and/or towers can rise and/or fall as a function of the music (e.g., a certain pitch can trigger the operation of a platform). As another example, during a bass-dominant part of a song, or during a specific musical section, a platform in the arena can rise up into the sky to create an ideal sniper position. When the bass track weakens, or when the music progresses to a different musical section, the platform can sink back to its default position. If a player knows the music in advance, the player can try to preemptively position themselves in the right location to take advantage of the sniper platform. Physical properties (e.g., transparency, height, etc.) of objects in the virtual world (e.g., walls) can change based on musical control.

If a player knows that a music change is coming, along with a corresponding terrain change, the player can try to position themselves accordingly to maximize the strategic advantage. For example, if a player knows a section change in the music is going to cause a platform to rise up as an ideal sniper platform, a player can try to position themselves appropriately to use the platform.

Parts of the virtual world can become accessible (e.g., unlocked) as a function of the musical properties. For example, a door may be unlocked only on the first downbeat of a chorus. Other examples include when predefined sections of a song plays, a suspension bridge becomes accessible and/or a door opens, allowing players to move to certain parts of the arena. At other parts of the song, floor tiles can fall away making it difficult for players to cross over these areas. Rather than during a specified section of the music, a door can open when the tempo is over 120 beats per minute. Additionally, moveable objects such as doors and bridges can operate when a player successfully fires their weapon at a target in the virtual world in accordance with a predetermined pattern that corresponds to musically significant events and/or trigger points.

Weapons can spawn at a particular point in a piece of music. For example, the weapon could be very effective for that section of the music (e.g., a weapon that can penetrate walls during a fast tempo can appear during a fast tempo part of a song). If the player knows the music is going to change, and where the spawn point will be, the player can try to obtain the weapon.

The musical soundtrack can control the availability of cover such that objects in the virtual world move, appear, and disappear as a function of the musical properties. For example, a wall or an obstacle that provides cover may appear, disappear, or move in time with beat or measure boundaries in the soundtrack and/or along with trigger points for respective weapons. When obstacles move rhythmically, they may act as cover against rhythmic weapons that operate at the same (or similar) frequency and/or pattern. Additionally, the frequency of cover can be slightly off from the tempo of the music.

For example, assume there is a weapon that can fire on the beat, at 120 bpm. Further assume that there is cover that rises up and down at 120 bpm. The cover could protect the player from the weapon (and/or prevent the player from firing their weapon). Another example is to have the cover rise up and down at 110 bpm. Over time, the mismatch between the song tempo and cover movement frequency would likely render the cover useless against the weapon. After more time, the tempos would cause them to slide back into sync, and the cover would be useful again. In other words, the cover would be effective for some amount of time, but can eventually drift off (and back on) and be ineffective against that rhythmic weapon.

The size of the virtual world can be a function of the musical properties of the music (e.g., the size of the virtual world can increase when louder, faster music is playing.). The size of rooms can change based on the properties of the music. The size of objects in the virtual world (e.g., a platform) can change depending on the music.

Regarding additional aesthetic elements, the virtual world can start off as largely monochromatic. As the game progresses, players can "paint" the arena by firing their weapons. How the players can "paint" the arena using the weapons depends on the properties of the music. The color of the arena can be also correlated with the functional elements. For example, a greener arena can be correlated with shorter curing period and recharge time. A redder arena can be correlated with higher maximum damage and faster player movement.

The game can include various visual cues to provide an indication of the appropriate time to trigger a weapon. Some of the exemplary cues are linear or circular.

FIGS. 3A-3C illustrate an exemplary view of a rifle scope that a player can use to zoom-in on and target an enemy. The rifle scope can include a circular visual cue system. In the figures, there is an enemy avatar 145. A circular cue 135, located at the top of a circle 140, can indicate the timing for a player to pull a trigger. A now indicator 130 shows the progression of time by rotating in circle (e.g., 130A, 130B, and 130C). The cue system can be designed so that the player can pull the trigger when the now indicator 130 reaches the circular cue 135 (or within a slop window thereof). Now indicators 130A and 130B, in this example, have not reached the circular cue 135. As time progresses, the now indicator 130 moves clockwise and is eventually overlapped with the circular cue 135, the overlap indicating to the player, for example, that the sniper rifle can fire at that time. Additionally, the sniper rifle can be configured to fire at any time, but the damage can be modulated as a function of how close the now indicator 130 is to the circular cue 135. The circular visual cue system can also include indicators on the circular cue 135 that mark the point at which firing is most damaging. The indicators can also indicate the presence of, and how large a slop window is. As demonstrated in FIGS. 3A-3C, circular cues can be used when a player looks through a scope on its sniper rifle to zoom in on its target. While the sniper rifle has been described above as using a circular cue, it an also (or alternatively) include a linear visual cue system.

Figure 4:
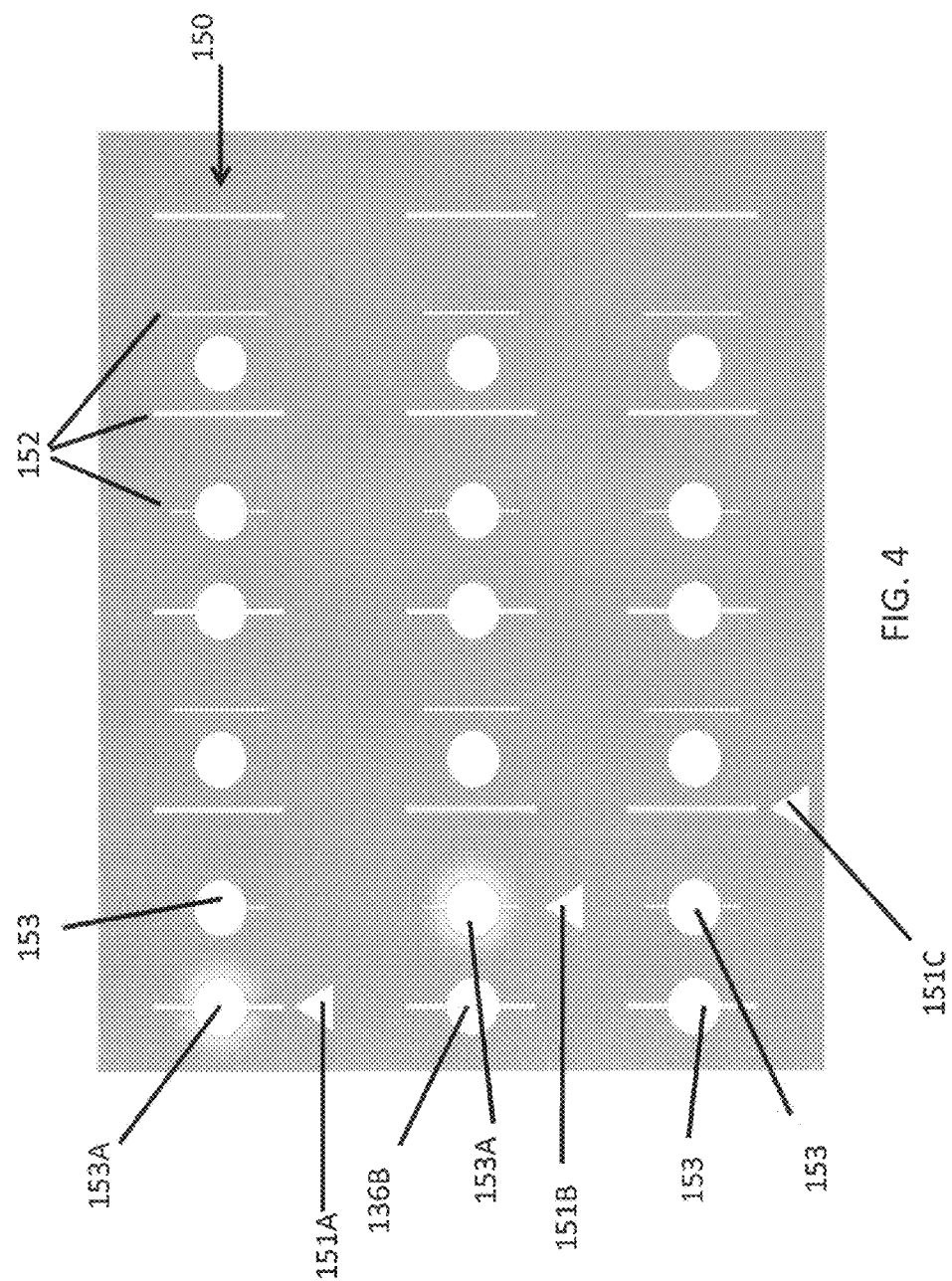
FIG. 4 includes exemplary screen shots of linear cues that provide timing information.

FIG. 4 illustrates various stages of the linear cue 150. The linear cue 150 can provide an indication of the timing for pulling a trigger. The linear cue indicator 150 can include a now indicator 151, timing indicators 152, and cues 153. Preferably, the now indicator 151 progresses across the linear cue indicator as time advances. The timing indicators 152 can indicate beats and/or notes in the music. The cues 153 can represent significant times, such as when a player is allowed to do something (e.g., fire a gun). The cues 153 can coincide with one or more notes in the music and/or a beat in the music. The cues 153, however, do not have to coincide with any specific beats or notes. The linear cue indicator 150 can be configured such that the now indicator 151 aligns vertically with one of the cues 153 at the same time a corresponding beat occurs in the background music. The game can be configured such that the brightness, shape, size, lighting, material, and/or color of the cue 153 can change when it is time for the player to pull the trigger. For example, cue 153A is brighter to indicate it is time for the player to pull the trigger.

In other embodiments of the game, rather than using predetermined background music, the player can "create" a musical soundtrack by interacting with the virtual world. For example, the firing of weapons can create a soundtrack and each weapon can effectively be a different instrument. The virtual world can start off having a sparse ambient soundtrack consisting of only enough information to cue the player to the underlying pulse and harmonic structure of the music. As the player fires a weapon, the firing of the weapon can unmute a stream of musical sound from an associated audio track that is playing (but muted) in the background of the game. For example, a player can unmute the bass track by firing the plasma gun. There can be any number of underlying musical tracks corresponding to different musical parts (e.g., guitar, bass, drum, hi-hat, cymbal, cowbell, etc.) that are selectively muted/unmuted depending on which weapon a player uses. The musical tracks that are unmuted do not have to correspond one-to-one with instruments and/or different parts. For example, the game can unmute blended synthesizer and drum parts, or it could unmute different synthesizer parts, depending on the weapon.

The music and/or corresponding metadata can come from a variety of sources. For example, the music can be multi-track (e.g., 13 streams audio for the duration of a song) and can be included with the game itself and/or downloaded. The metadata can be provided from several sources. For example, metadata can include and/or be derived from MIDI information (e.g., note, velocity, CC values), FFT from audio analysis, waveform shape analysis, amplitude analysis, text and/or number values stored in a lookup table and/or text file. Preferably, each is synchronized to the music using, for example, a timestamp. Firing noises (e.g., sound effects) associated with the weapons can come from places like full length streams of wav data, looped streams of wav data, one-off samples, and real-time synthesized data from a sampler.

In some embodiments, a note in the music can be a "shot" from the weapon. Each weapon can have its own tactical and musical attribute that expands or transforms the game soundtrack. The audio created by the weapons can be spatialized to player location. For example, the sound can be processed so that it seems to originate from the 3D location in the arena near the player's avatar. Additionally, sound can be spatialized as a function of a weapon's damage path and/or point of impact. In multi-player version game, the game can become an act of group music-making, where a challenge in the game is for the players to select complementary weapons/instruments that can create a complete song.

The slop window discussed above can also be used to enhance the process of unmuting the background track. Music that is not in synchrony can sound poorly performed. For example, if shooting a weapon triggers the playing of a sound, the timing of the sound will probably not be synchronized to the music. Lag between the game platform and the audio output system can make this effect more pronounced. Thus, under the mute/unmute embodiment, if a player pulls a trigger before the correct timing (e.g., before the beat), but within the slop window, the game can keep the corresponding music track muted until the correct point in time (e.g., at a time that is quantized in sync with the music). In some embodiments, the game can presume that the player will pull the trigger after the correct timing, but within the slop window. In this situation, if the player successfully pulled the trigger a predetermined number of times in the past, the game can assume that the player will pull the trigger again within the slop window. At the correct timing, the game can unmute the corresponding musical track, but if the player does not successfully pull the trigger within the slop window, the game can re-mute the corresponding track (possibly resulting in a chirp sound).

The game can also provide auditory feedback to a player based on whether the player is inflicting damage on another player and/or whether the player is being hurt by another player. Instead of playing a bodily sound (e.g., "ugh," "oww," "doh") as feedback, the music can change to reflect that a player is inflicting damage. For example, as a player continuously inflicts damage on another player using the harpoon/tether weapon described herein, the game can unmute a corresponding musical track.

Another method of controlling the musical soundtrack is to have the background music transition from one portion to another based on gameplay. For example, the game can loop the bridge of a song repeatedly until a player triggers a predetermined event, at which time the game can transition the music from the bridge to a chorus.

Players can "tune" weapons so that they fire different musical sounds having different properties. For example, a player can tune a weapon so that it creates music tuned to C♯, so that it has a specific tempo, so that it has a specific loudness, etc. The tuning can be done dynamically by the player as the player fires the weapon.

Figure 5:
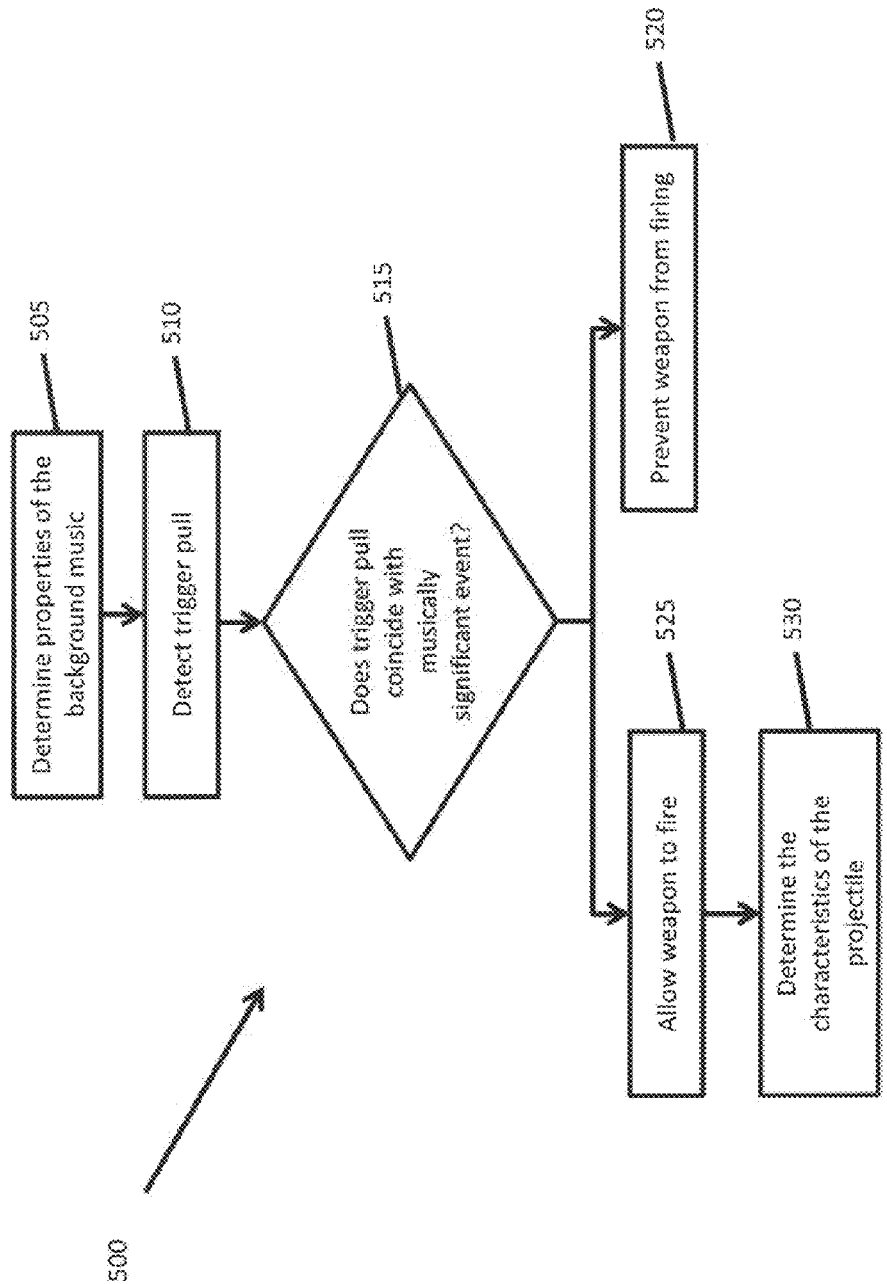
FIG. 5 is an exemplary process flow diagram for firing a weapon.

In operation, referring to FIG. 5, a process 500 for controlling weapons used in the game includes the stages shown. The process 500, however, is exemplary only and not limiting. The process 500 may be altered, e.g., by having stages added, removed, altered, or rearranged.

At stage 505, the game can determine musical properties of the music being used with the game using metadata relating to the music. The metadata can be provided along with the music (e.g., the metadata can be authored) or it can be determined in real-time using musical analysis tools.

At stage 510, the game can detect a trigger actuation (e.g., a trigger pull). The trigger actuation of the virtual world can be in various forms in the real world depending on the controller. Some examples of trigger actuation are a trigger pull, a trigger release, a button press, a button release, movement of a joystick, movement of a controller, movement of a console, movement of a body part, etc. Stated differently, a trigger can be pulled, for example, by pressing a specific button on a controller, moving a joystick to a certain position, pressing a virtual button on a touch screen, performing a certain motion for a camera-based controller, etc. A trigger "pull" does not require that a player actually "pull" something. Trigger pull and trigger actuation are used interchangeably herein.

At stage 515, the game can determine whether the trigger pull coincides with predetermined event, such as a musically significant event and/or trigger point. The game can determine this using a slop window. For example, if a player triggers a weapon within a symmetrical and/or asymmetrical window of time surrounding a predetermined event (e.g., ±100 ms, +50/−100 ms, etc.) the game can consider the trigger pull to coincide with the predetermined event. If the trigger pull does not coincide with the predetermined event, the process 500 continues to stage 520, otherwise it continues to stage 525.

At stage 520, the game can prevent the weapon from firing, can modify the damage caused by the weapon, and/or can trigger another action (e.g., draining health if a player mistimes a trigger pull).

At stage 525, the game allows the weapon to fire and/or makes the weapon more powerful. This can be, for example, the firing of a bullet, rocket, grenade, minions, missile, etc. In some embodiments, the "firing" can be the detonation and/or arming of a device like a landmine and/or grenade.

At stage 530, the game can determine the characteristics of the projectile (or explosion). The characteristics can include aesthetic and/or functional characteristics. The aesthetic characteristics can be, for example, the size, shape, color, and/or intensity of the projectile and/or a visualization emanating from the projectile and/or weapon. The functional characteristics can include, for example, the range, intensity, speed, and/or damage path of the weapon.

Included herewith are a number of screen shots showing embodiments of some of the subject matter described herein.

Figure 6A:
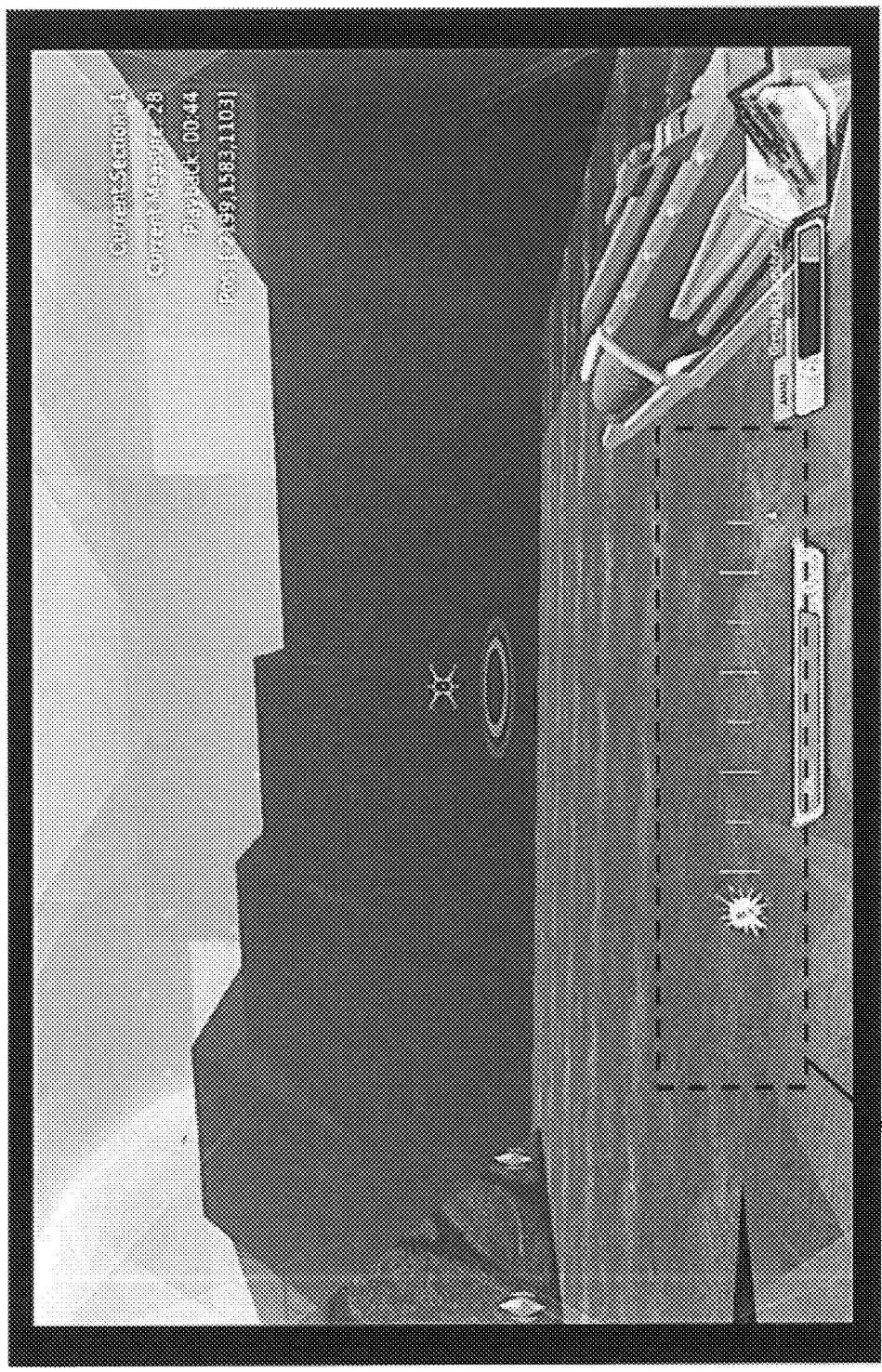
FIGS. 6A-7F show exemplary screen shots of a grenade being fired from a grenade launcher.
Figure 6C:
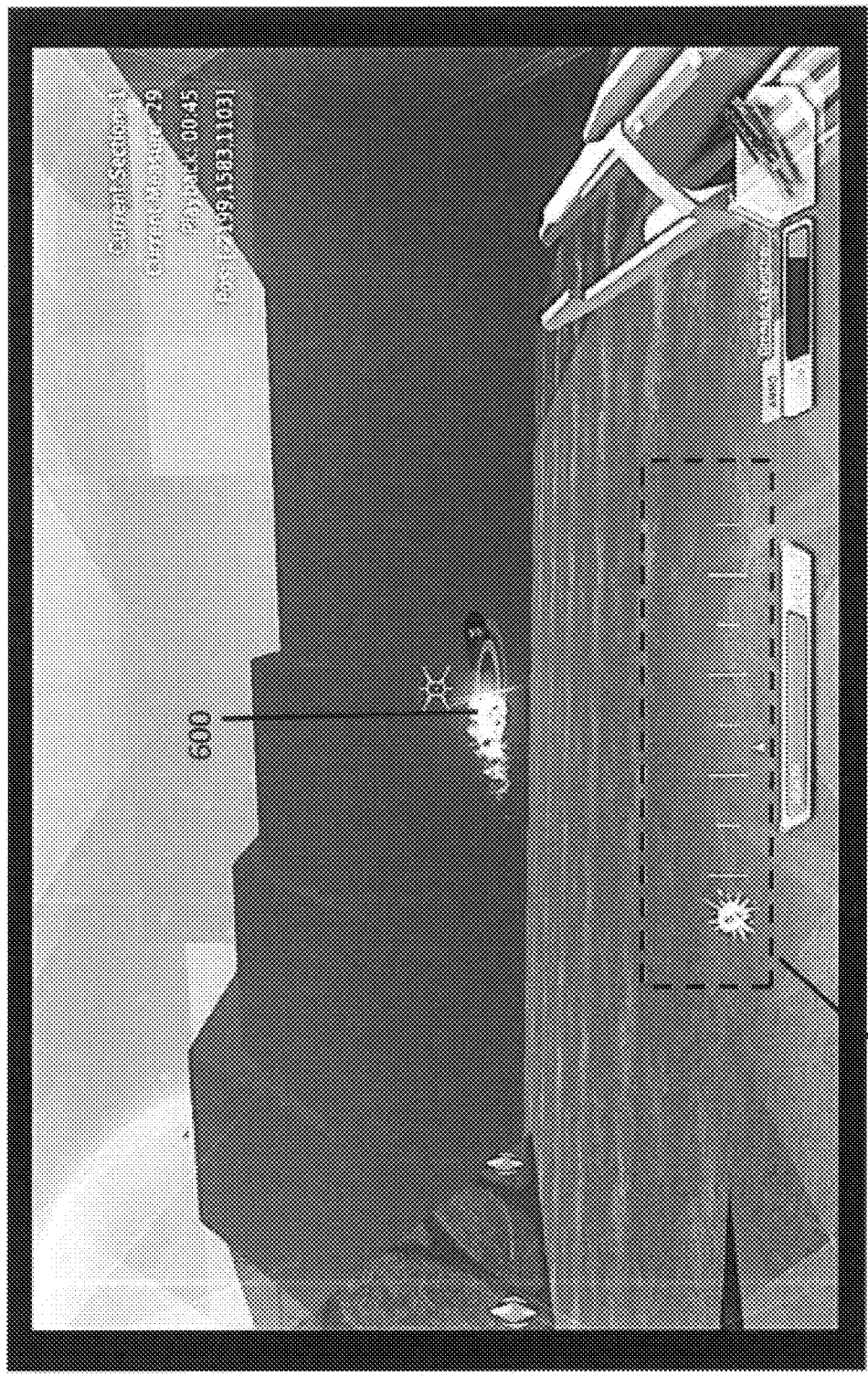
Figure 6D:
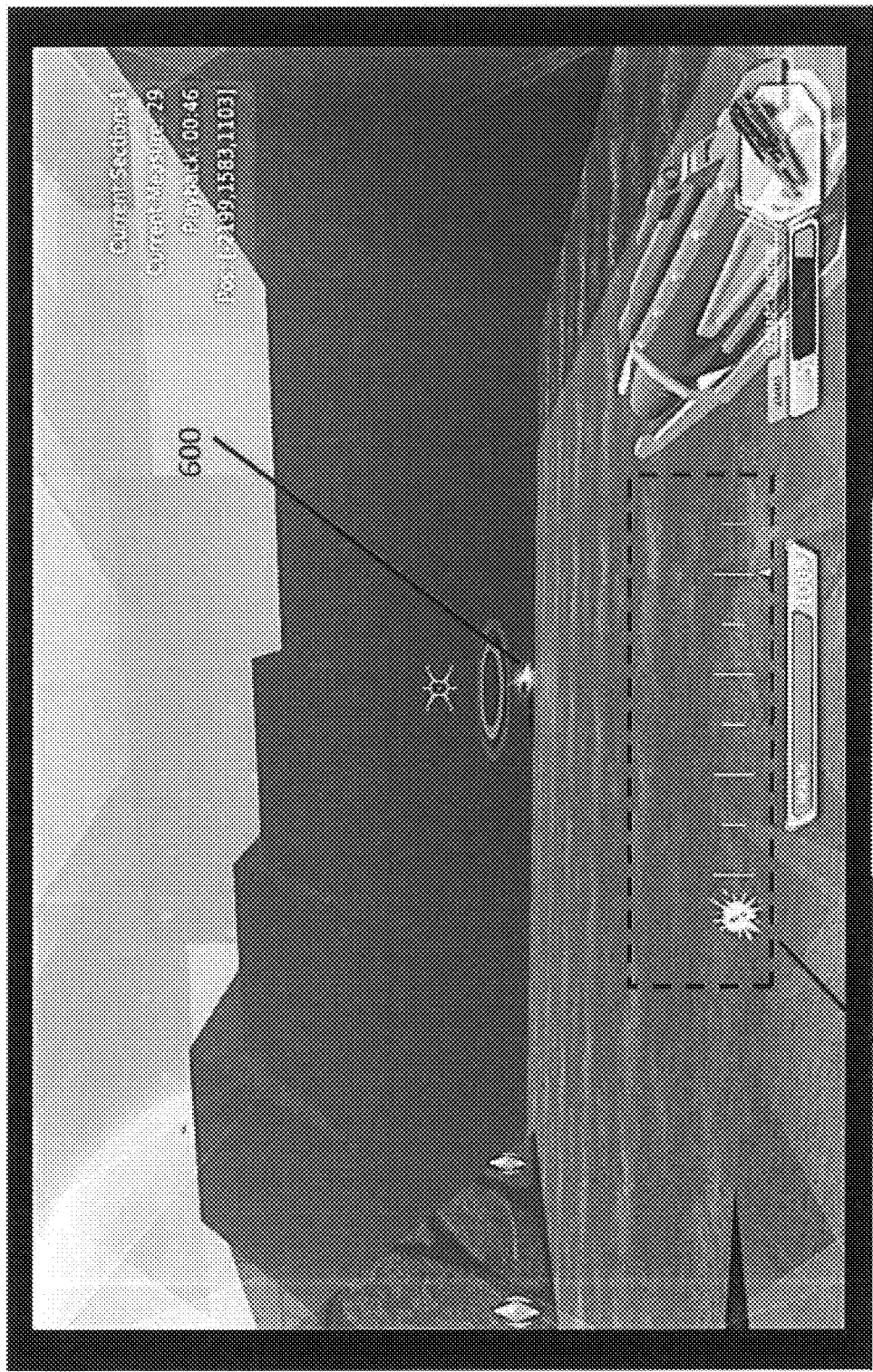
Figure 6E:
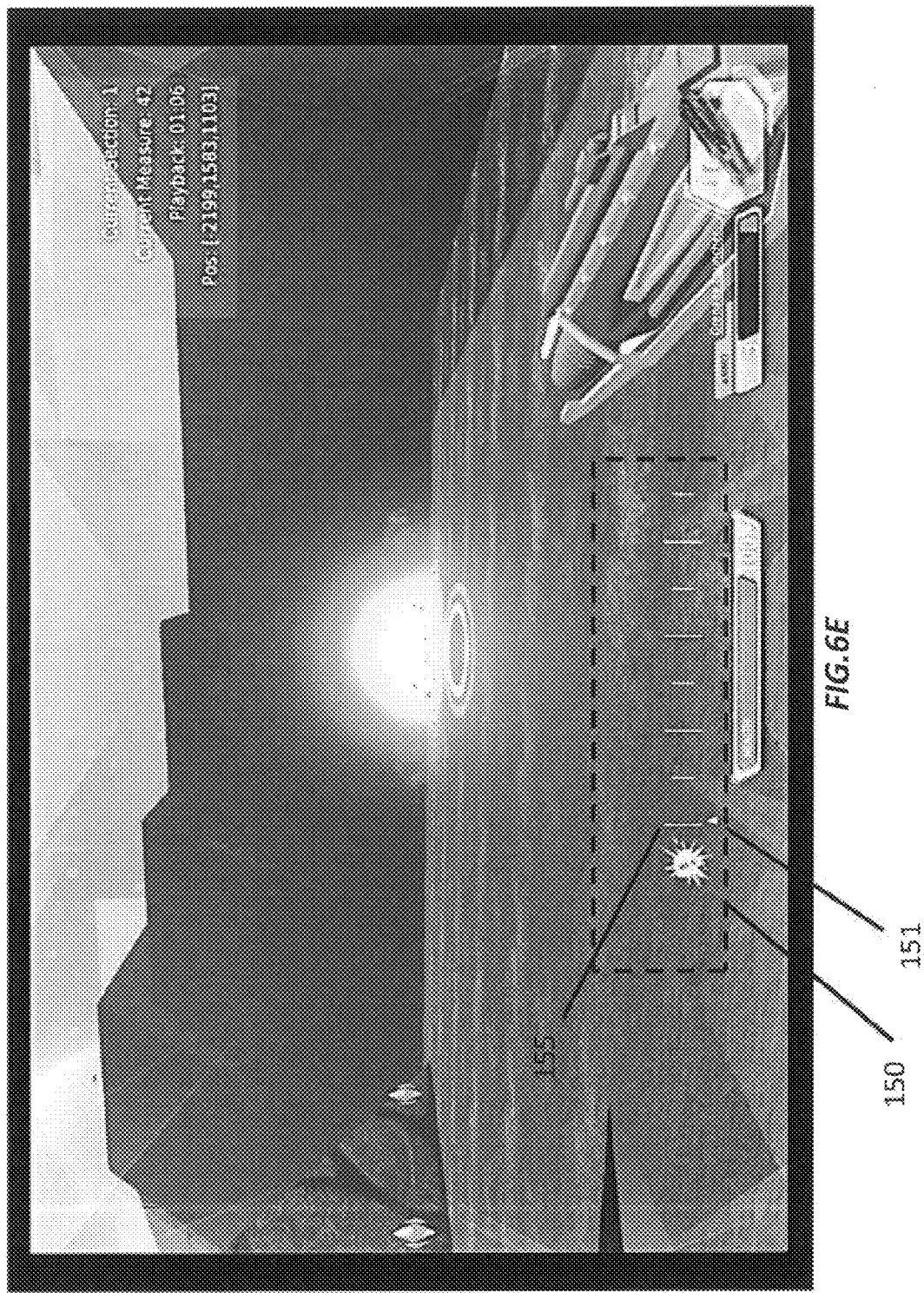
Figure 6F:
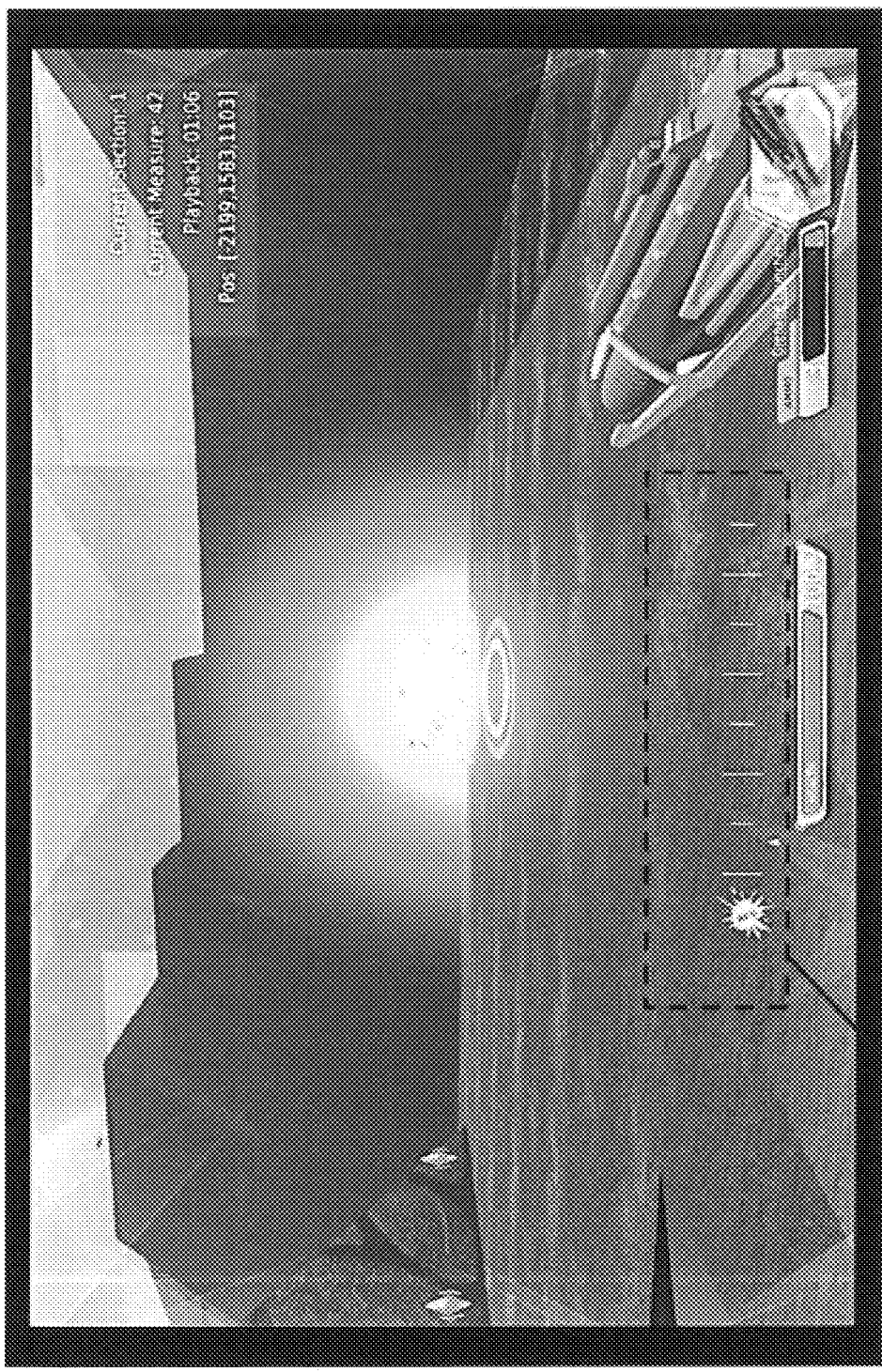
Figure 7A:
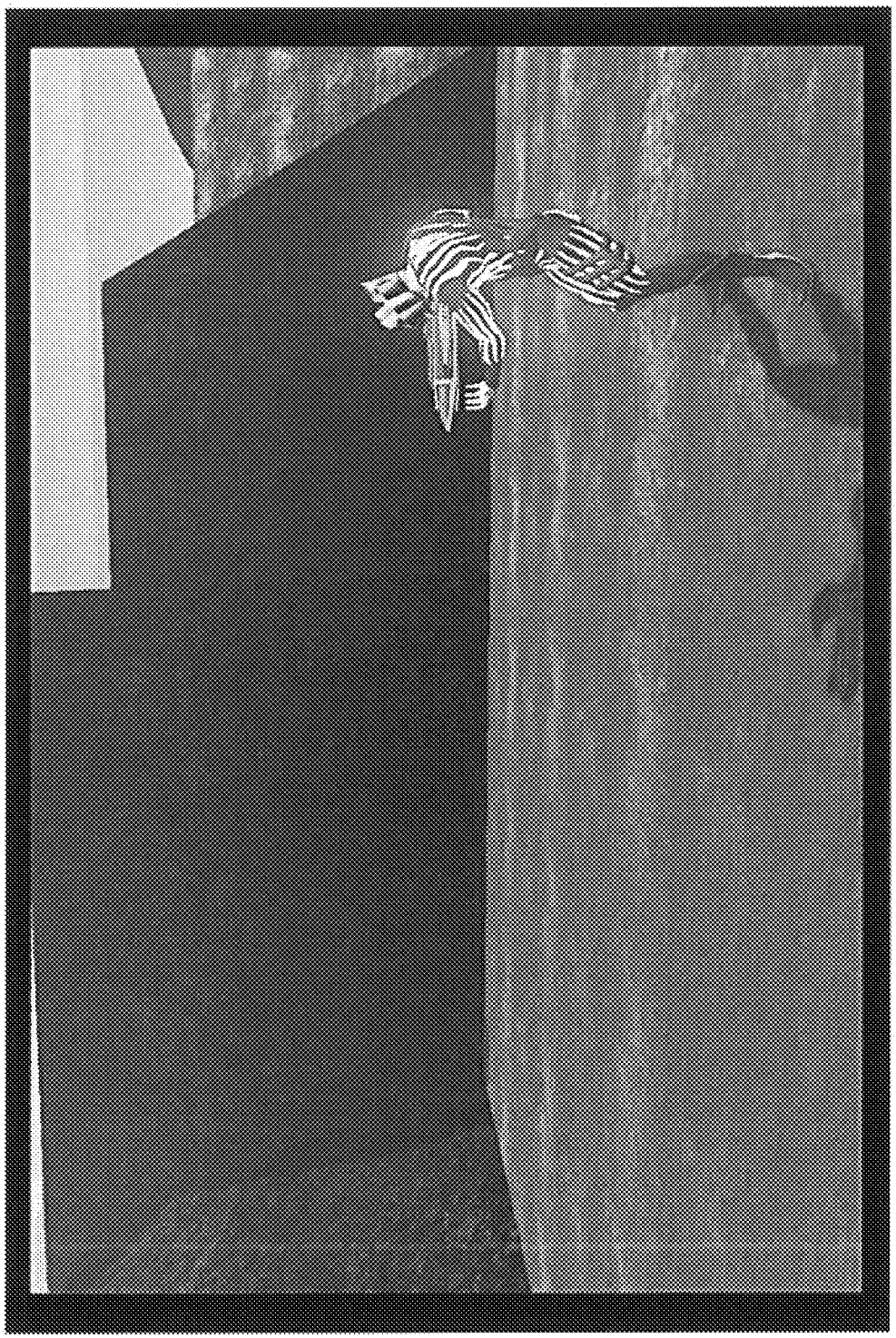
Figure 7B:
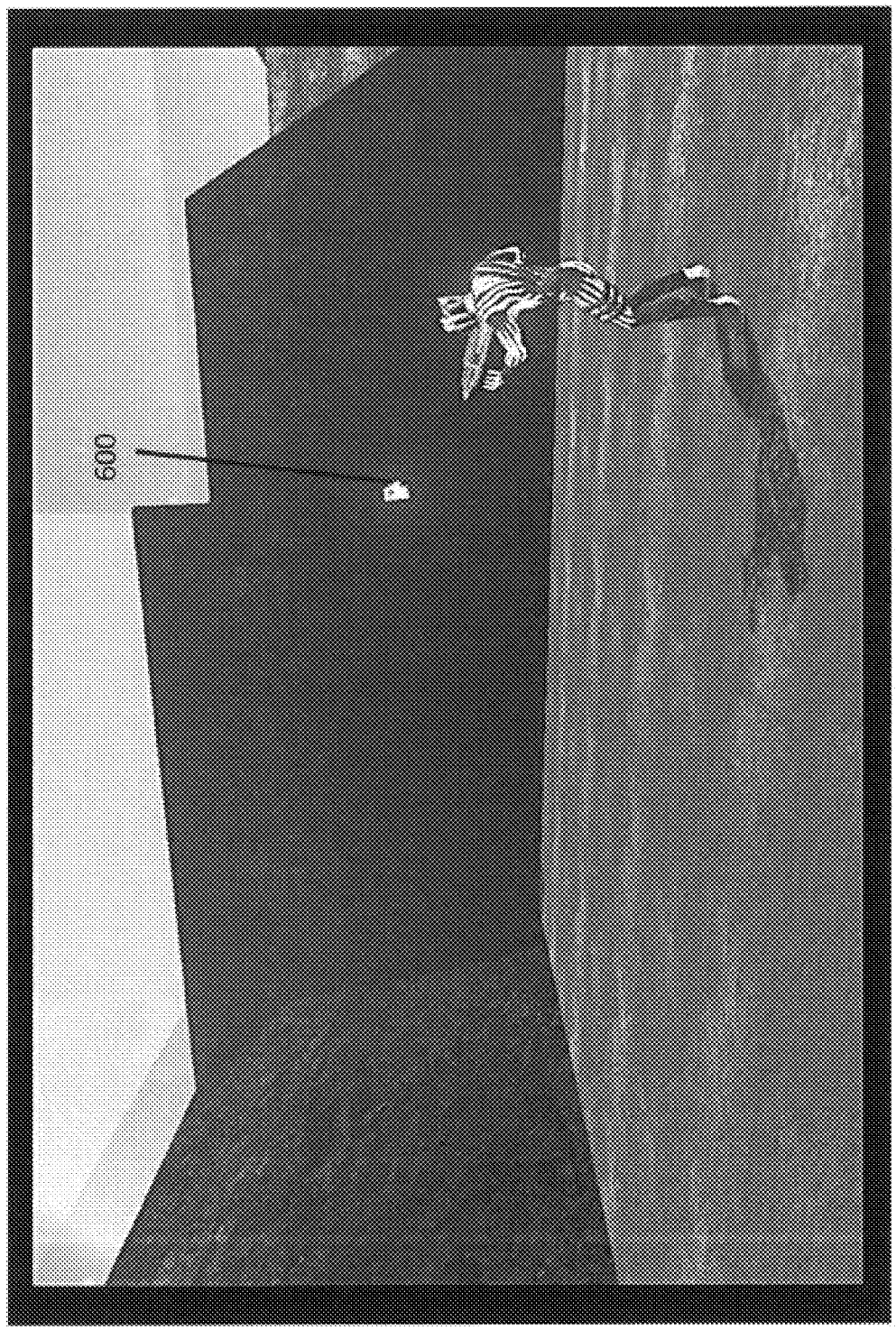
Figure 7C:
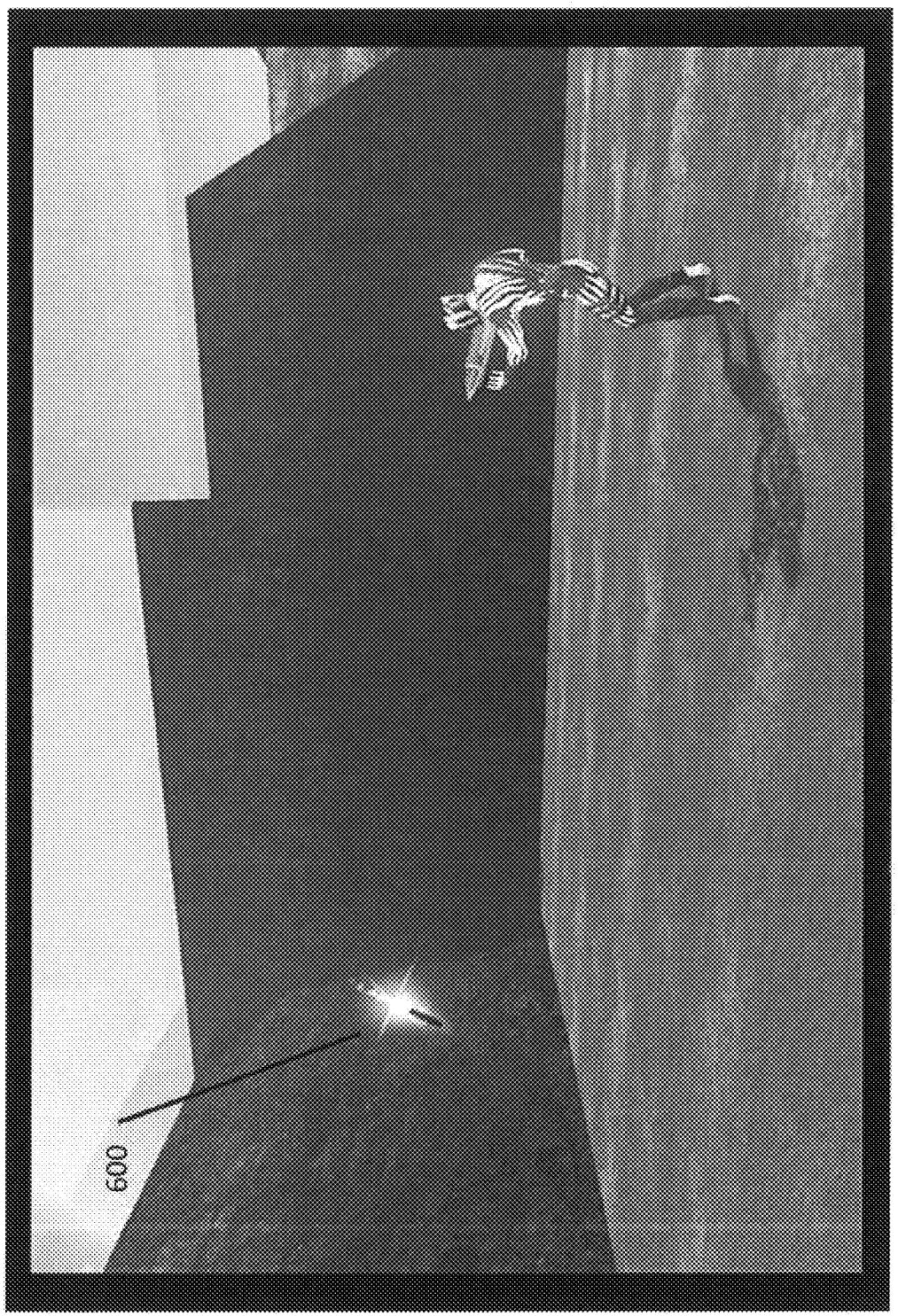
Figure 7D:
Figure 7E:
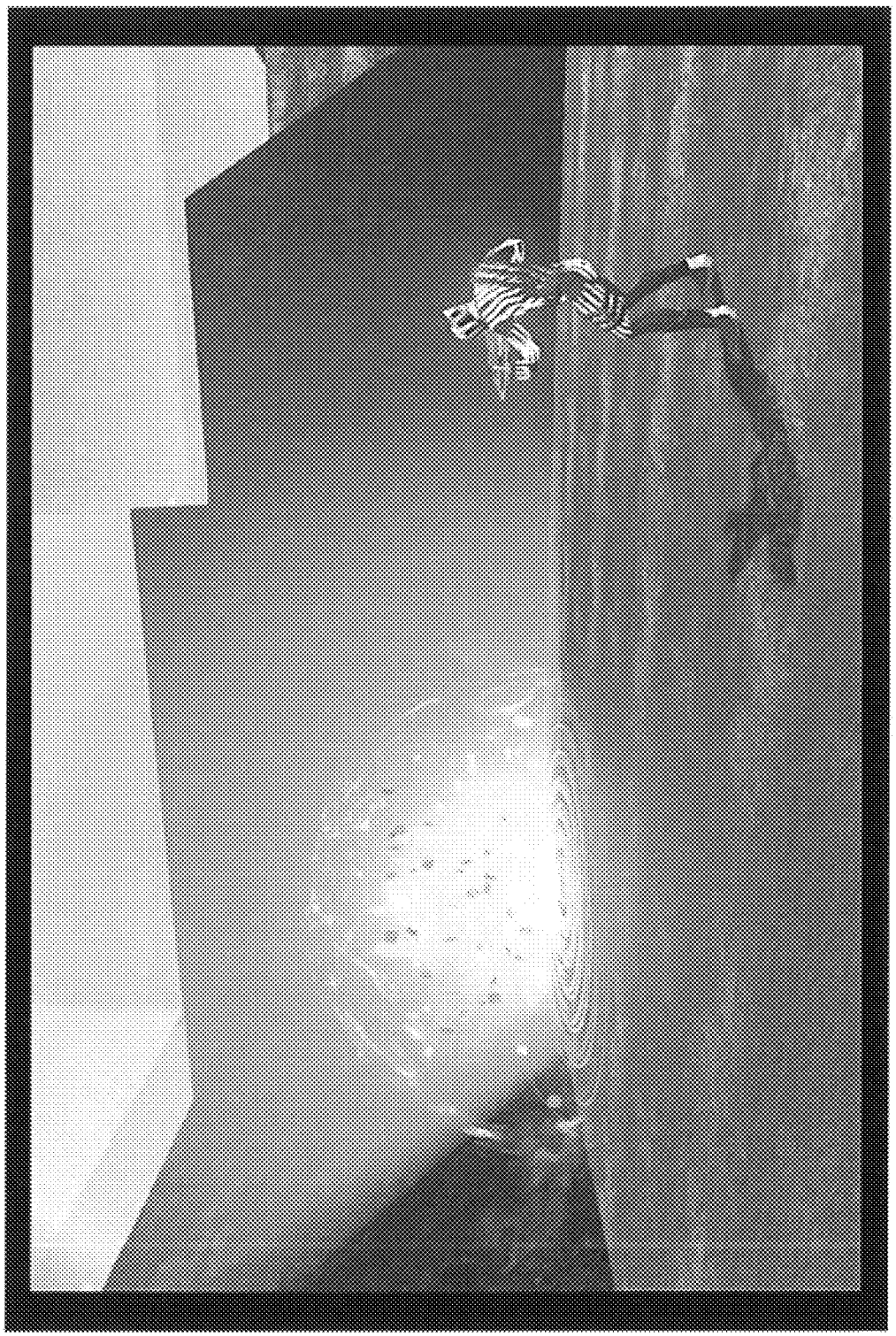
Figure 7F:
Figure 8A:
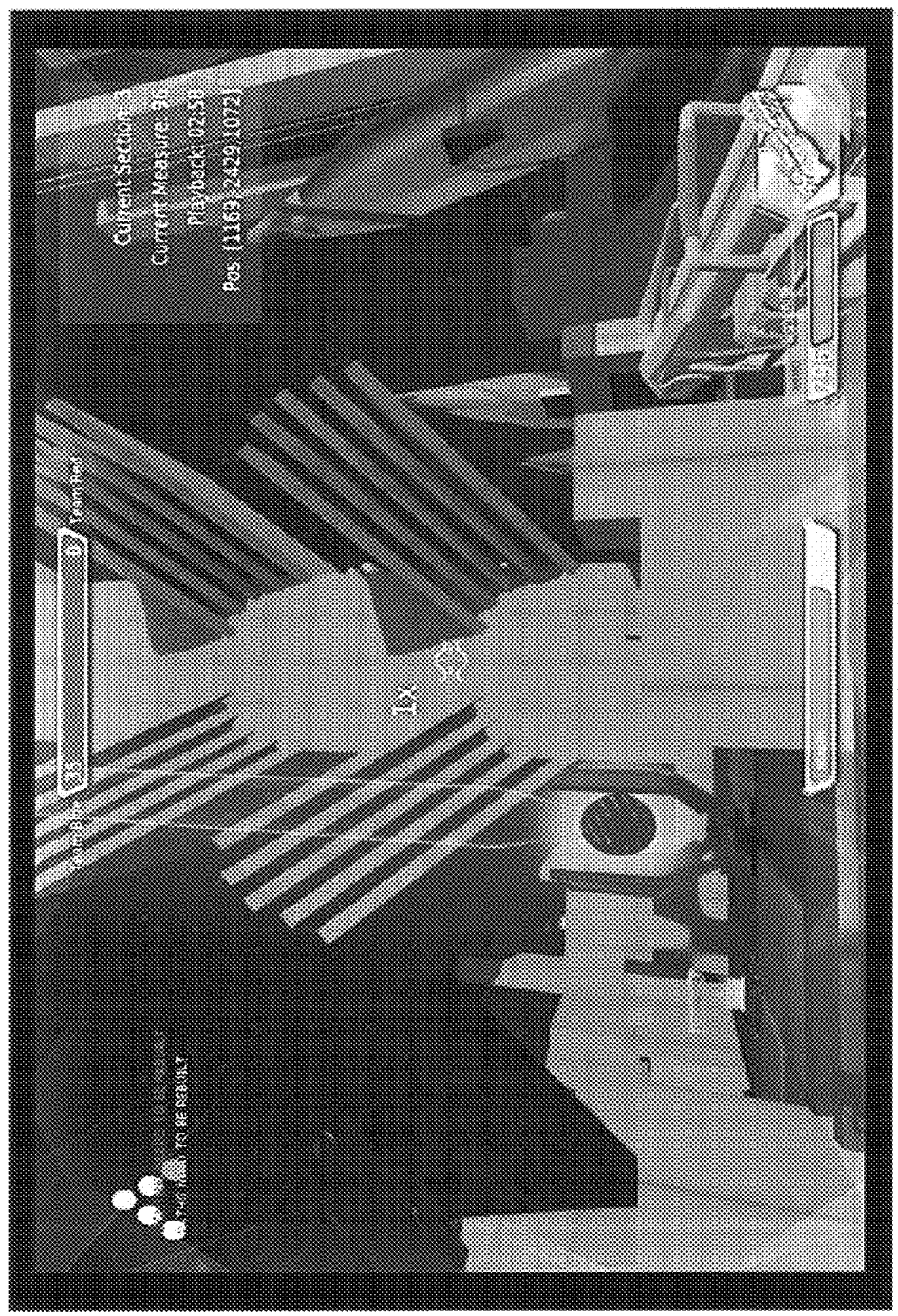
FIGS. 8A-9I show exemplary screen shots of a light rifle being fired.
Figure 8B:
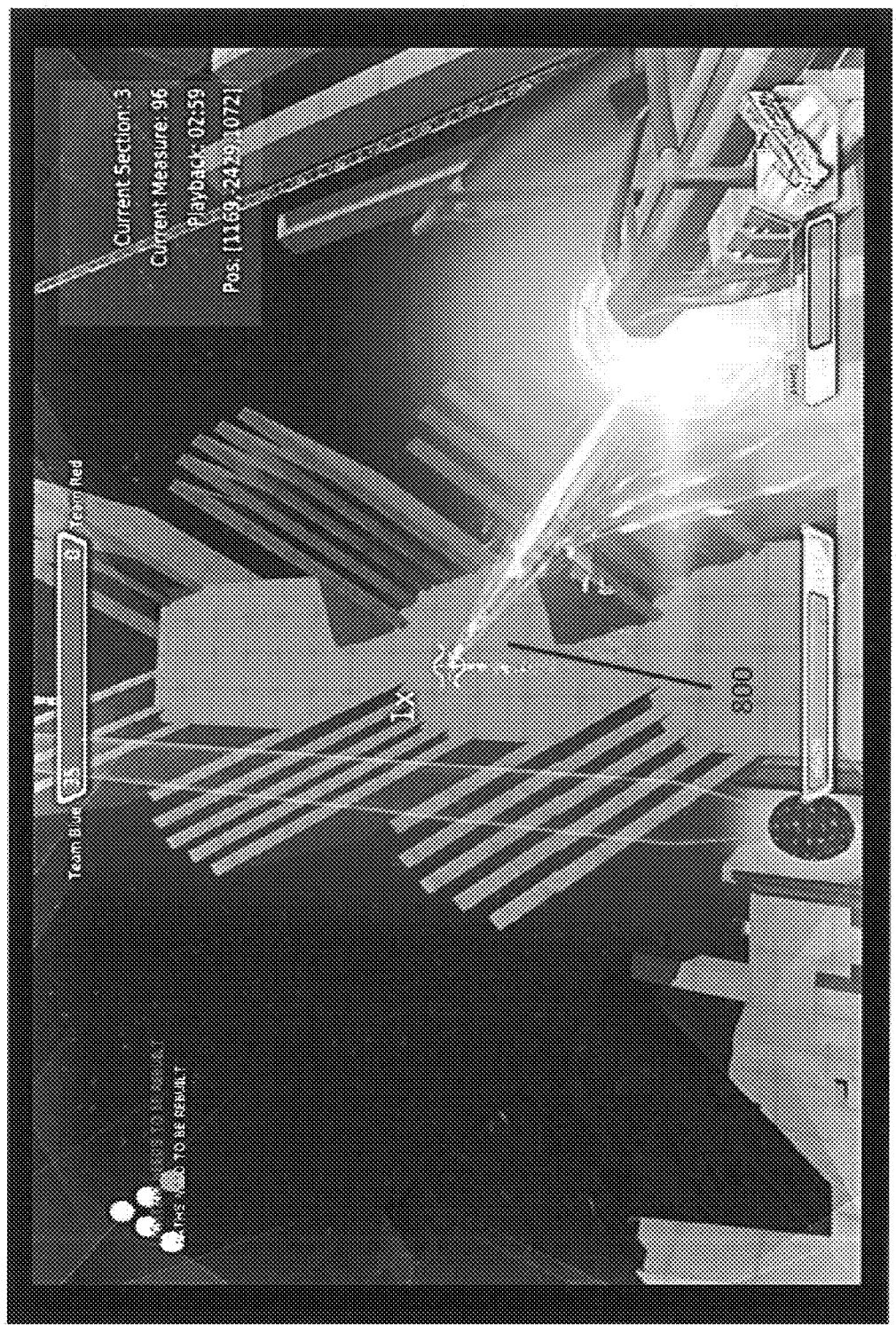
Figure 8C:
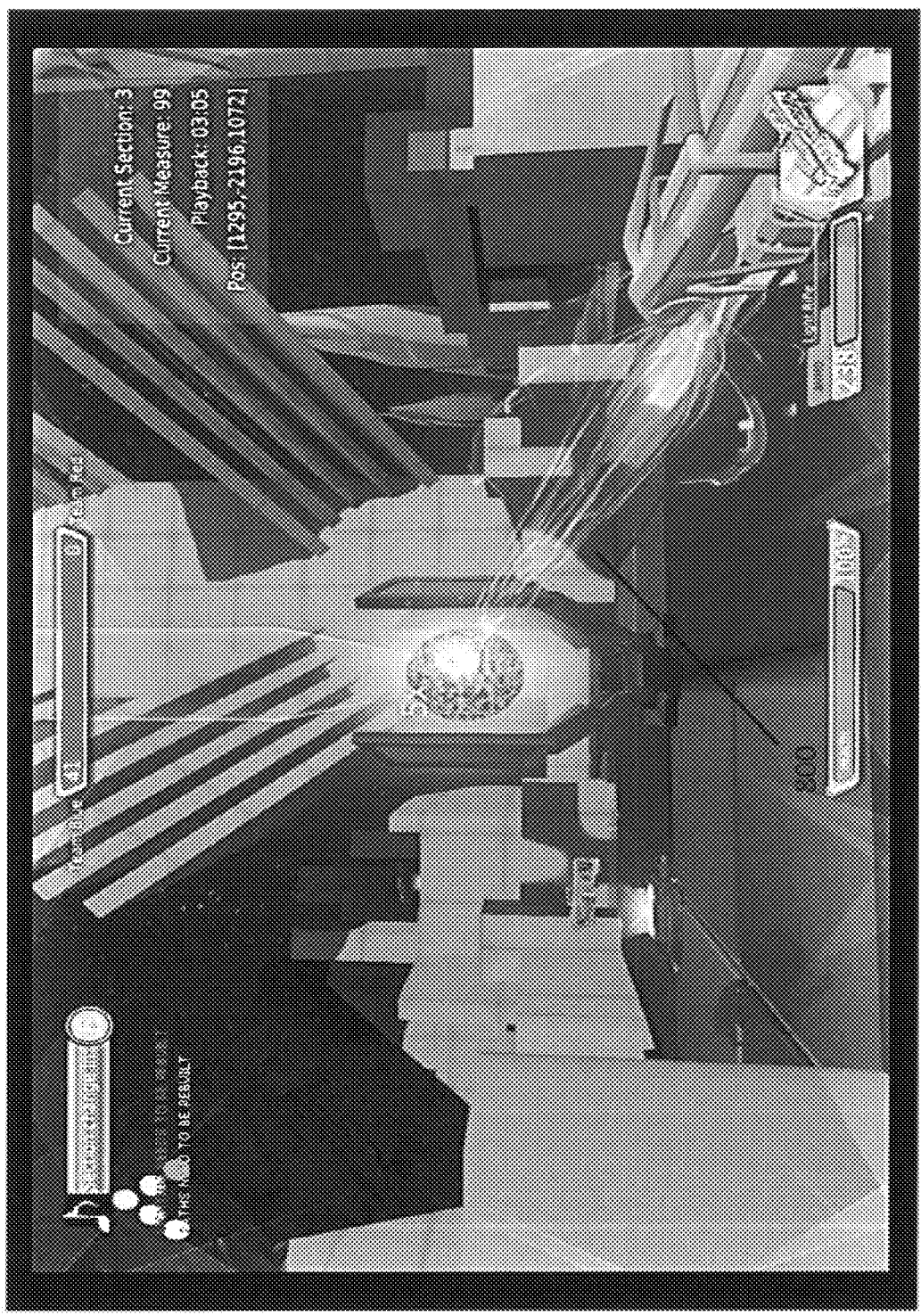
Figure 9A:
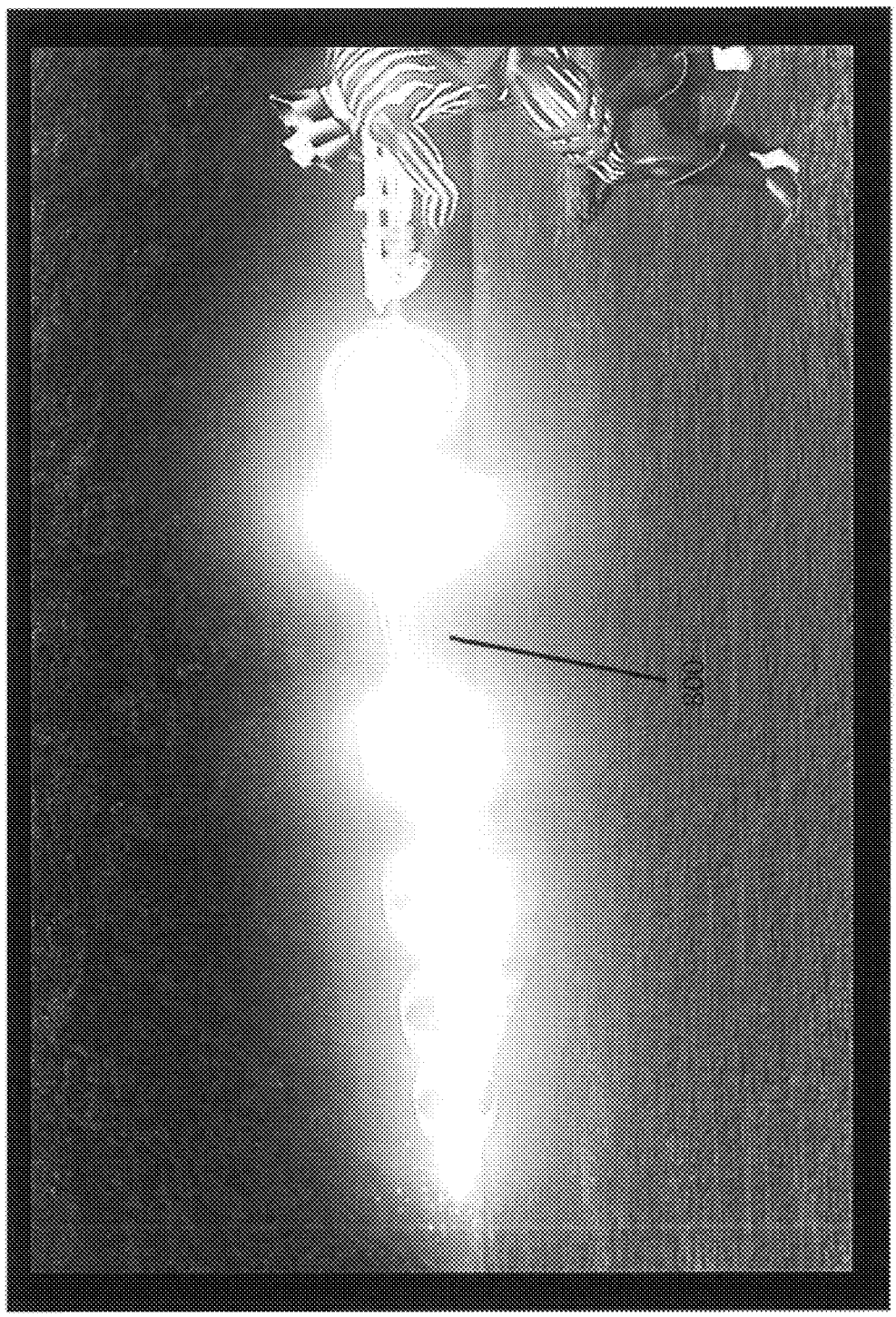
Figure 9B:
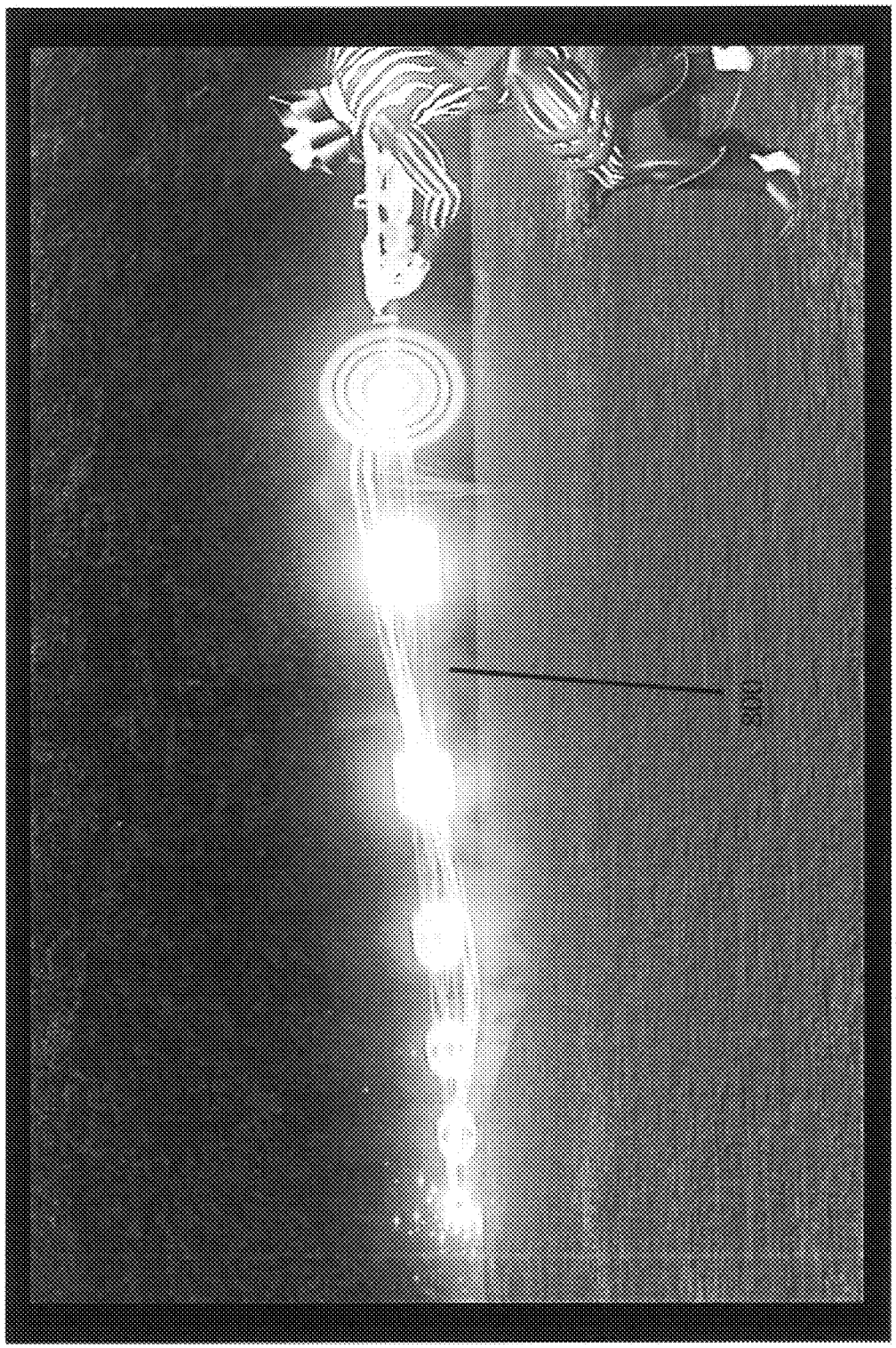
Figure 9C:
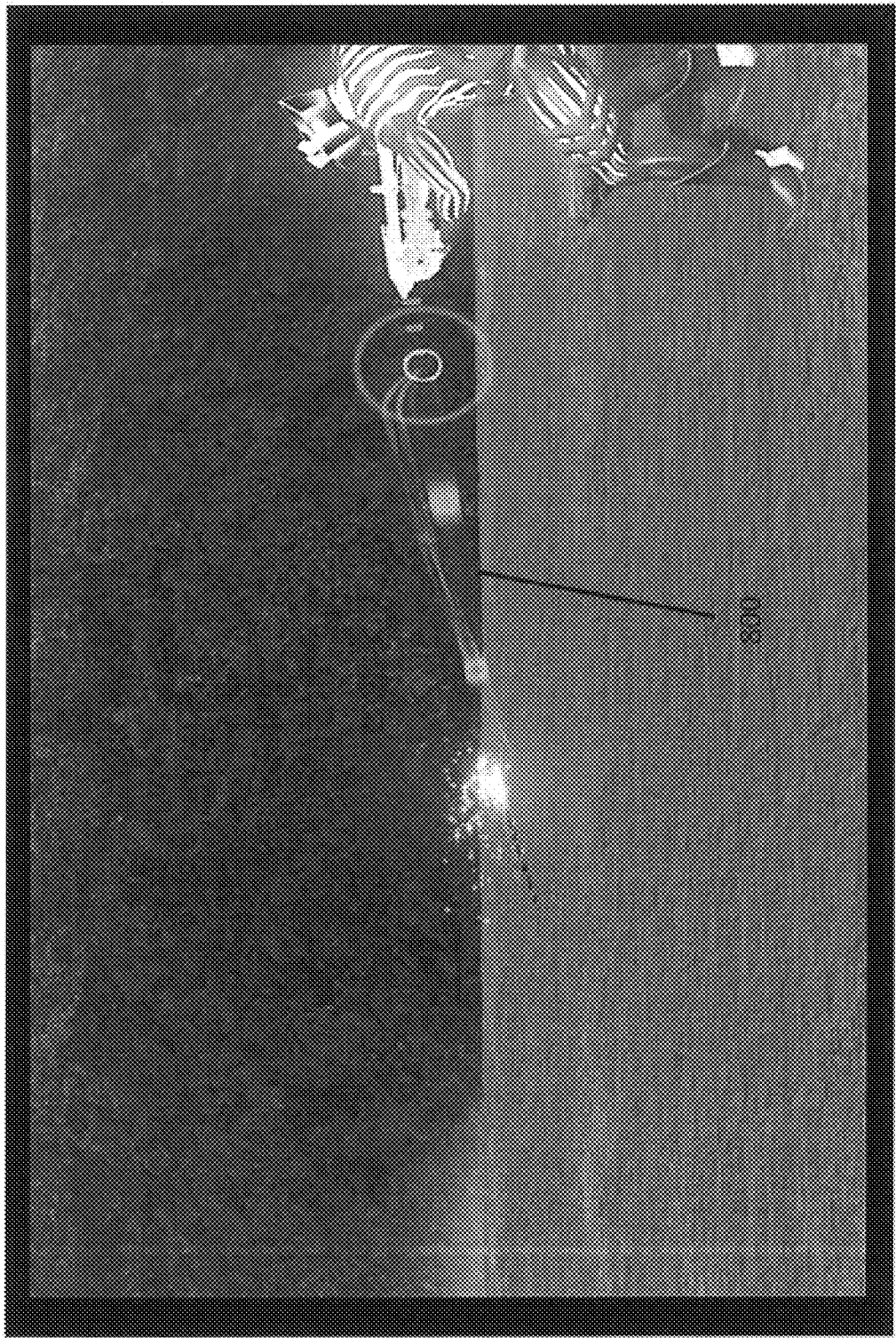
Figure 9D:
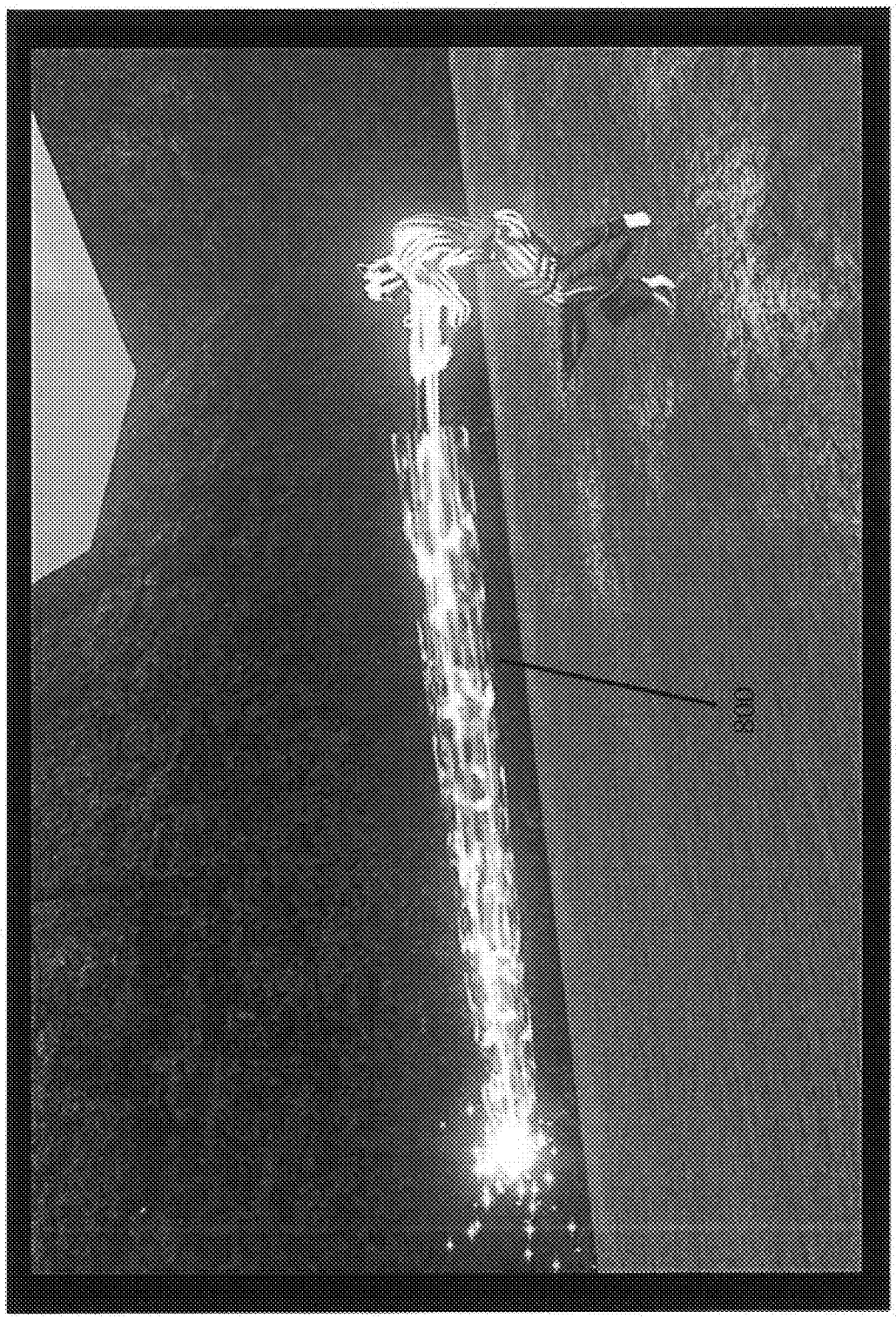
Figure 9E:
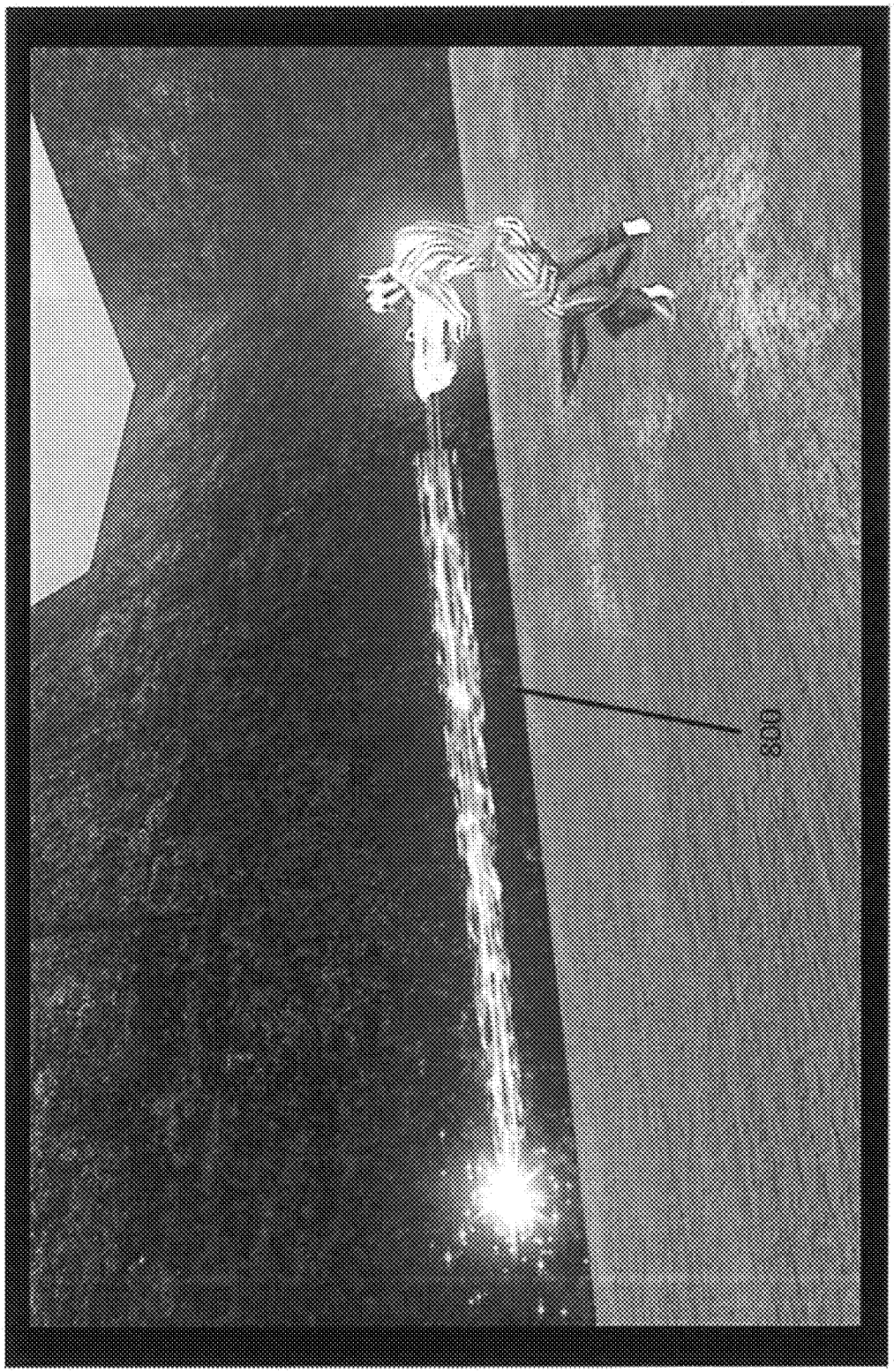
Figure 9F:
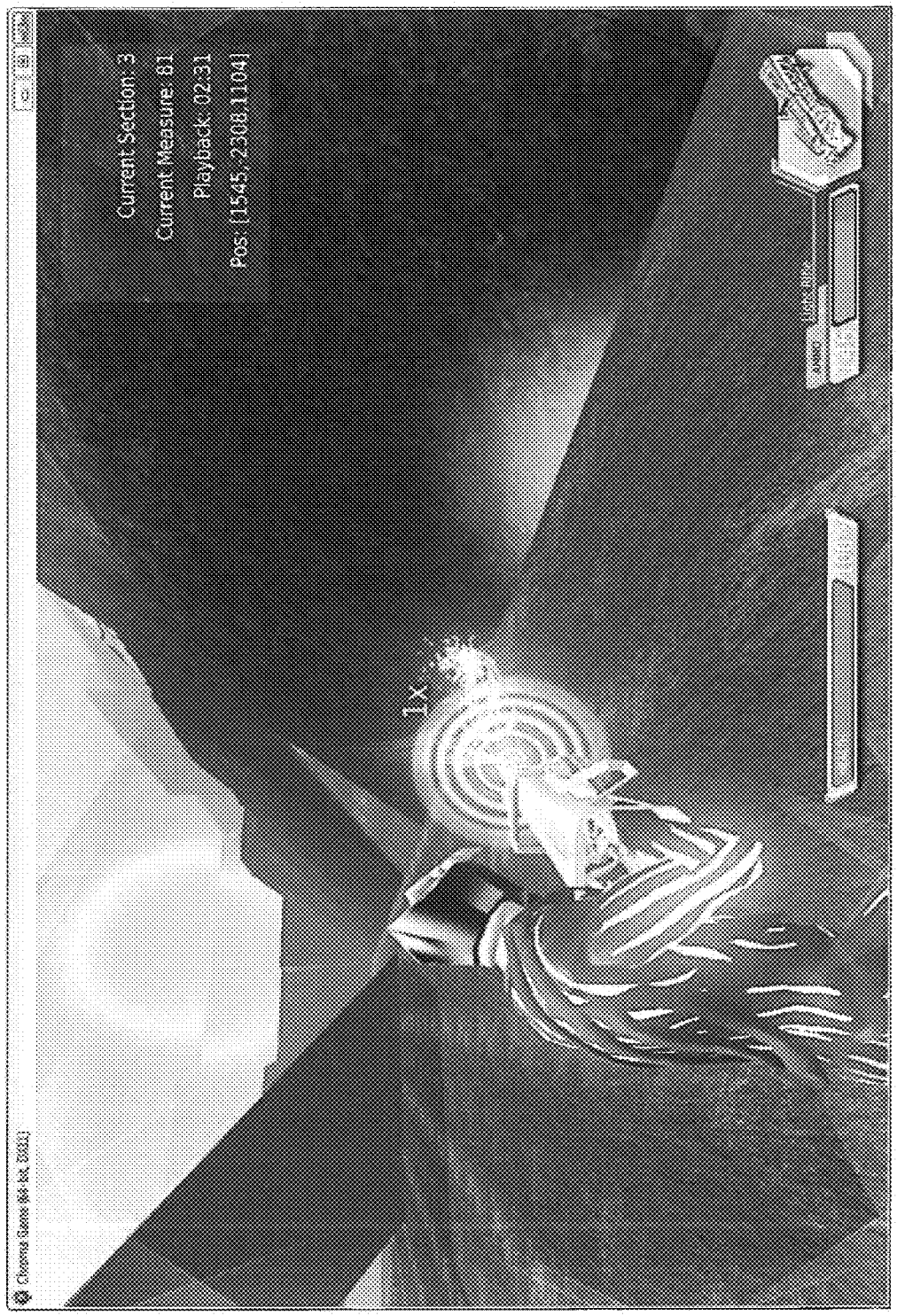
Figure 9G:
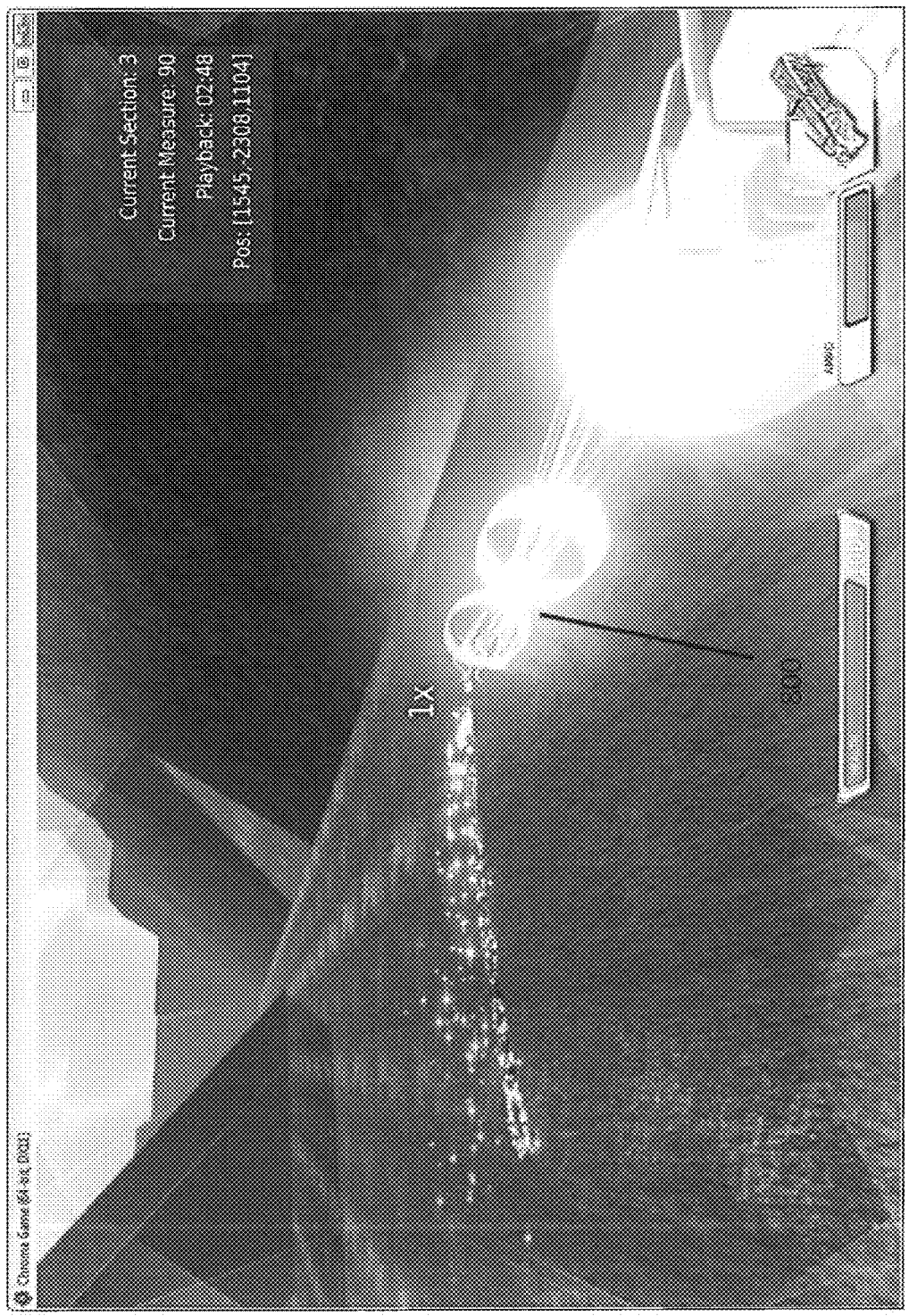
Figure 9H:
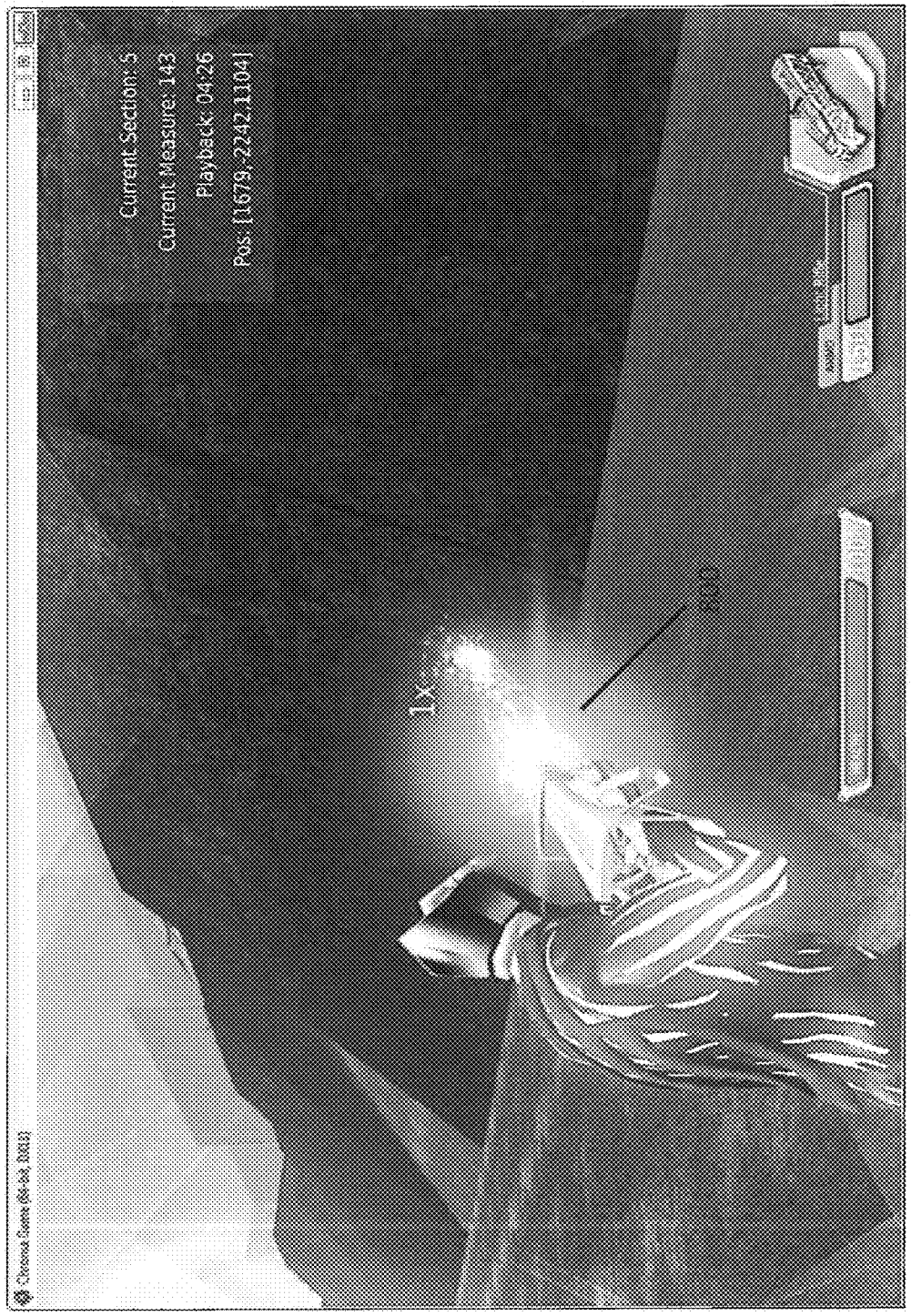
Figure 9I:
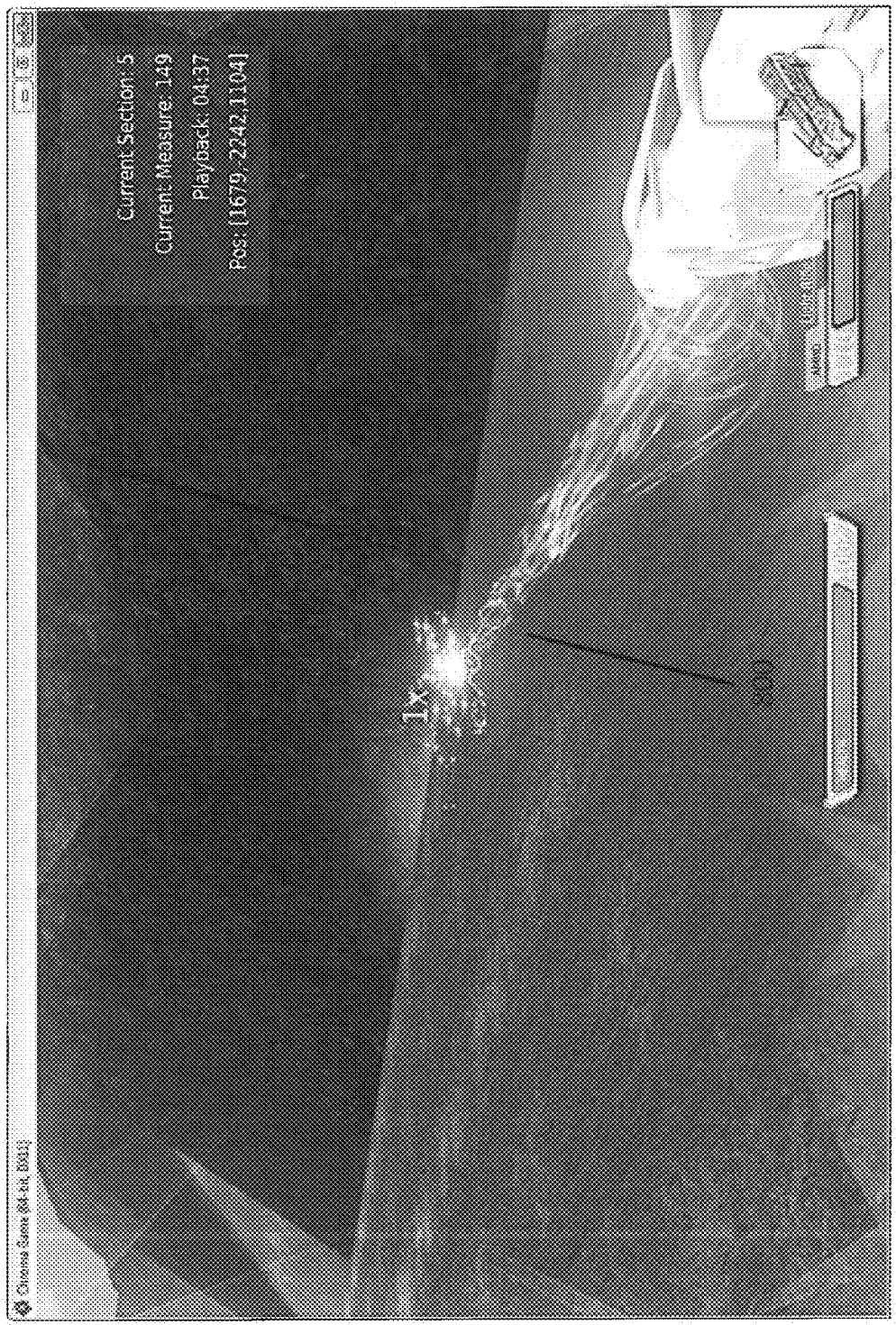

Referring to FIGS. 6A-6F, these exemplary screen shots show a grenade being fired from a grenade launcher from the first-person perspective. As can be seen from FIG. 6B, a projectile 600 (a grenade) can be fired when the now indicator 151 is anywhere in the linear cue indicator 150. In FIG. 6C the projectile 600 is in mid-flight accompanied by a visualization that is a function of music. In FIG. 6D the projectile 600 is in mid-flight. In FIG. 6E-6F, it can be seen that the grenade explodes when the now indicator 150 corresponds with downbeat indicator 155. FIGS. 7A-7F show the same process from a third-person point of view.

Referring to FIGS. 8A-9I, these exemplary screen shots show a light rifle being fired. As can be seen by comparing the various figures, the projectile 800 emanating from the weapon can vary as it is fired, in accordance with the music. For example, in FIG. 9A the projectile 900 is larger than it is in FIG. 9B, which is larger than it is in FIG. 9C (which can be a function of the music). Referring to FIG. 9D, another visualization of the projectile 900 is shown (i.e., one without the rings shown in FIG. 9B.

Figure 10A:
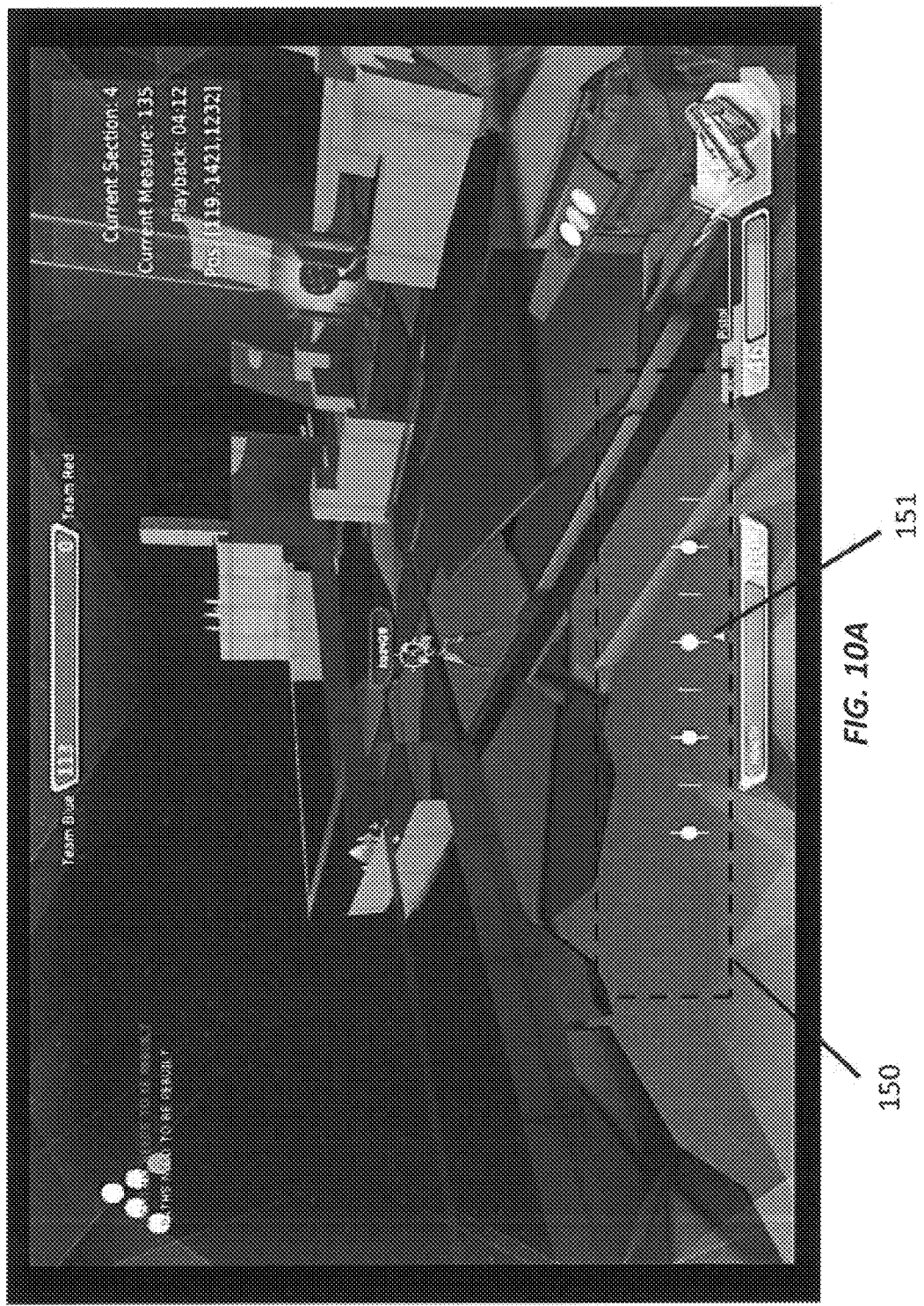
FIGS. 10A-11C show exemplary screen shots of a pistol being fired.
Figure 10B:
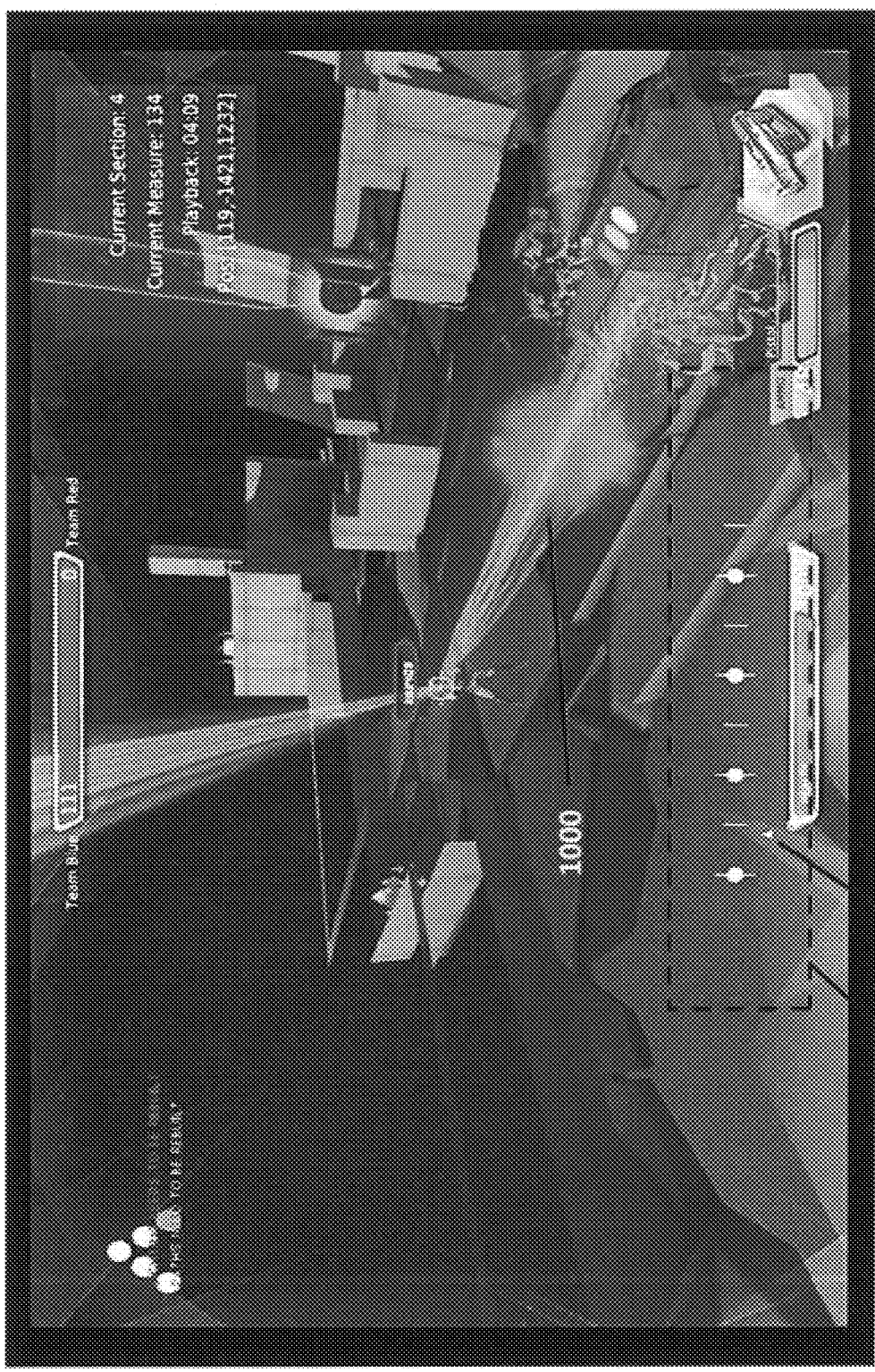
Figure 10C:
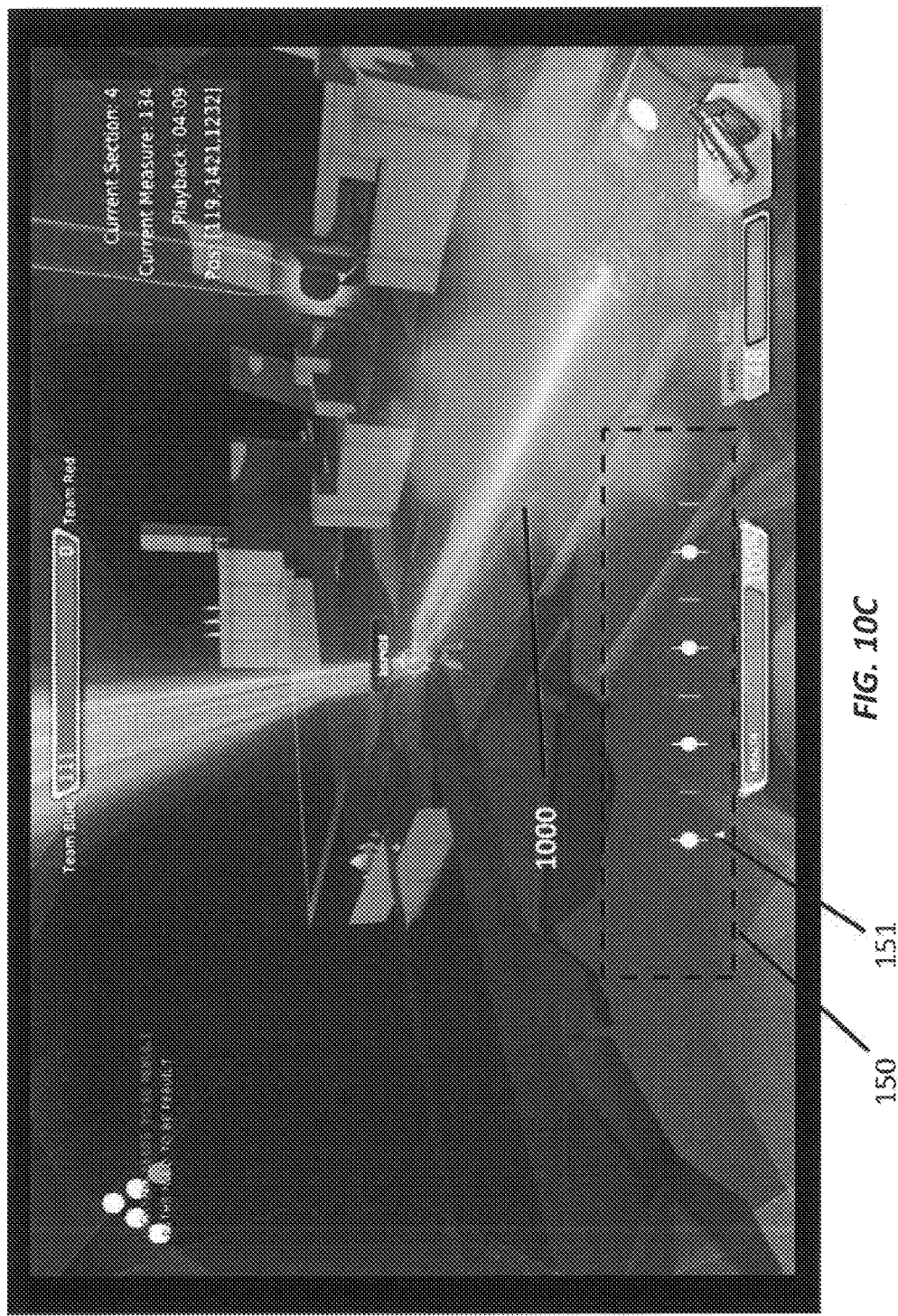
Figure 11A:
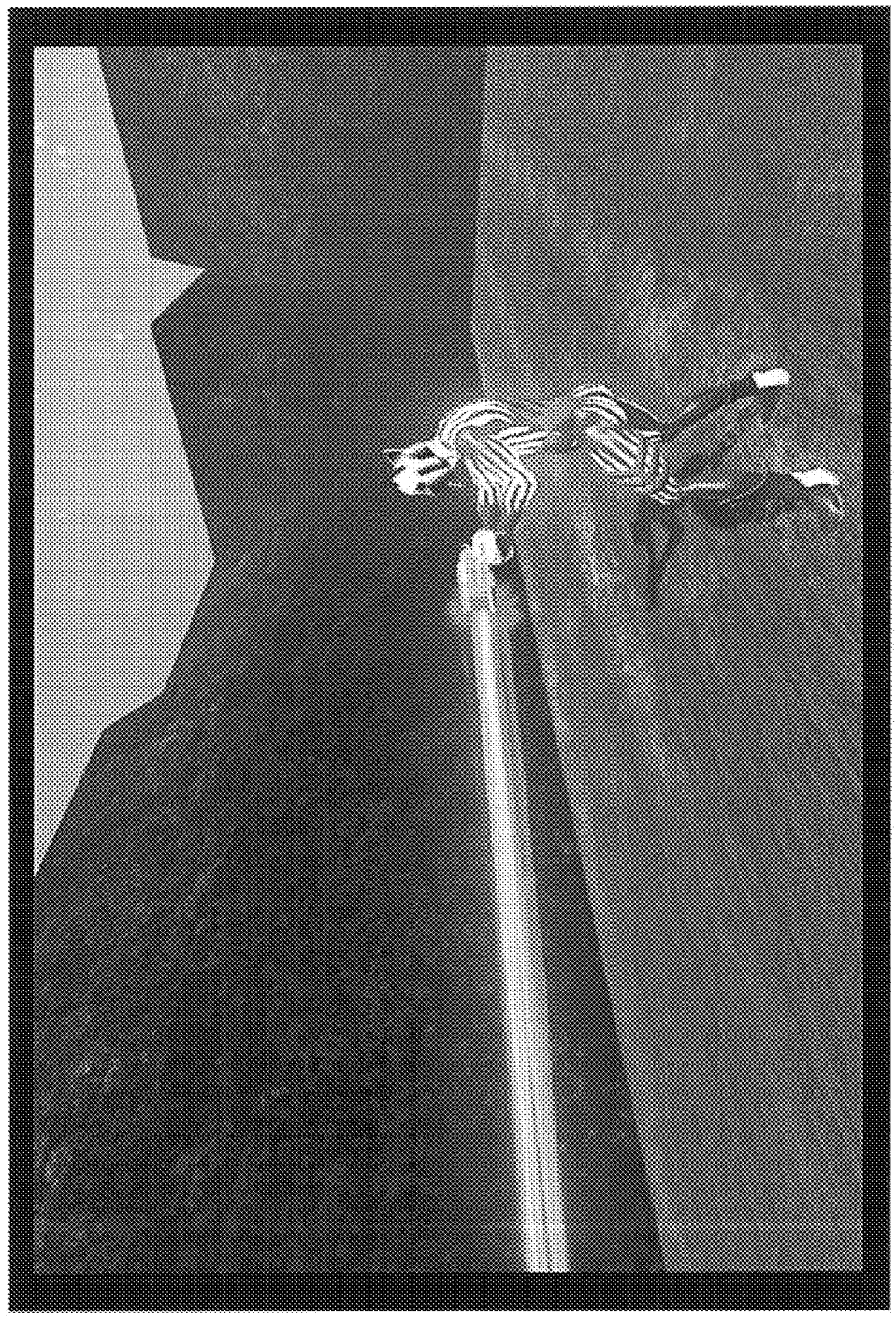
Figure 11B:
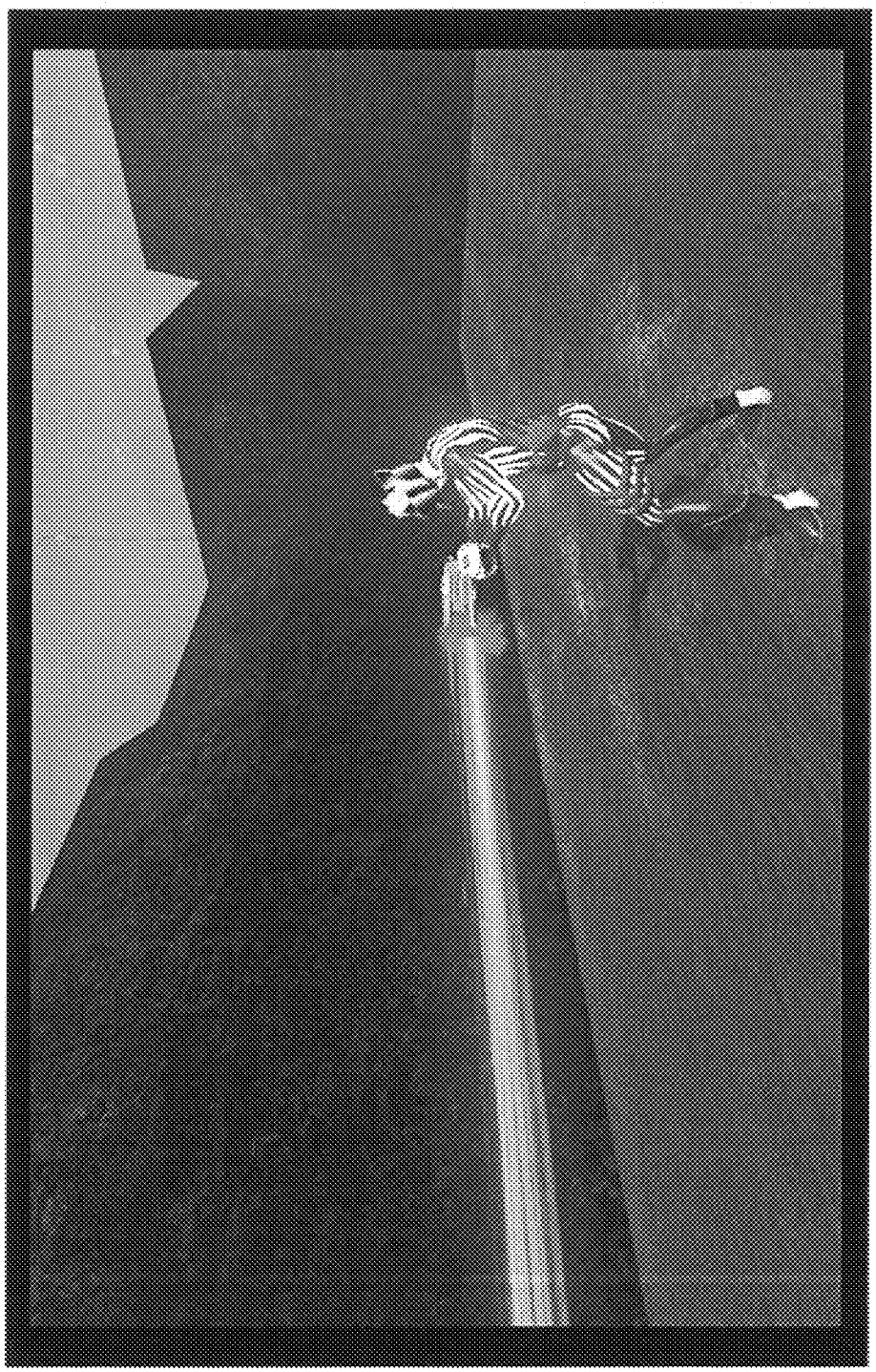
Figure 11C:
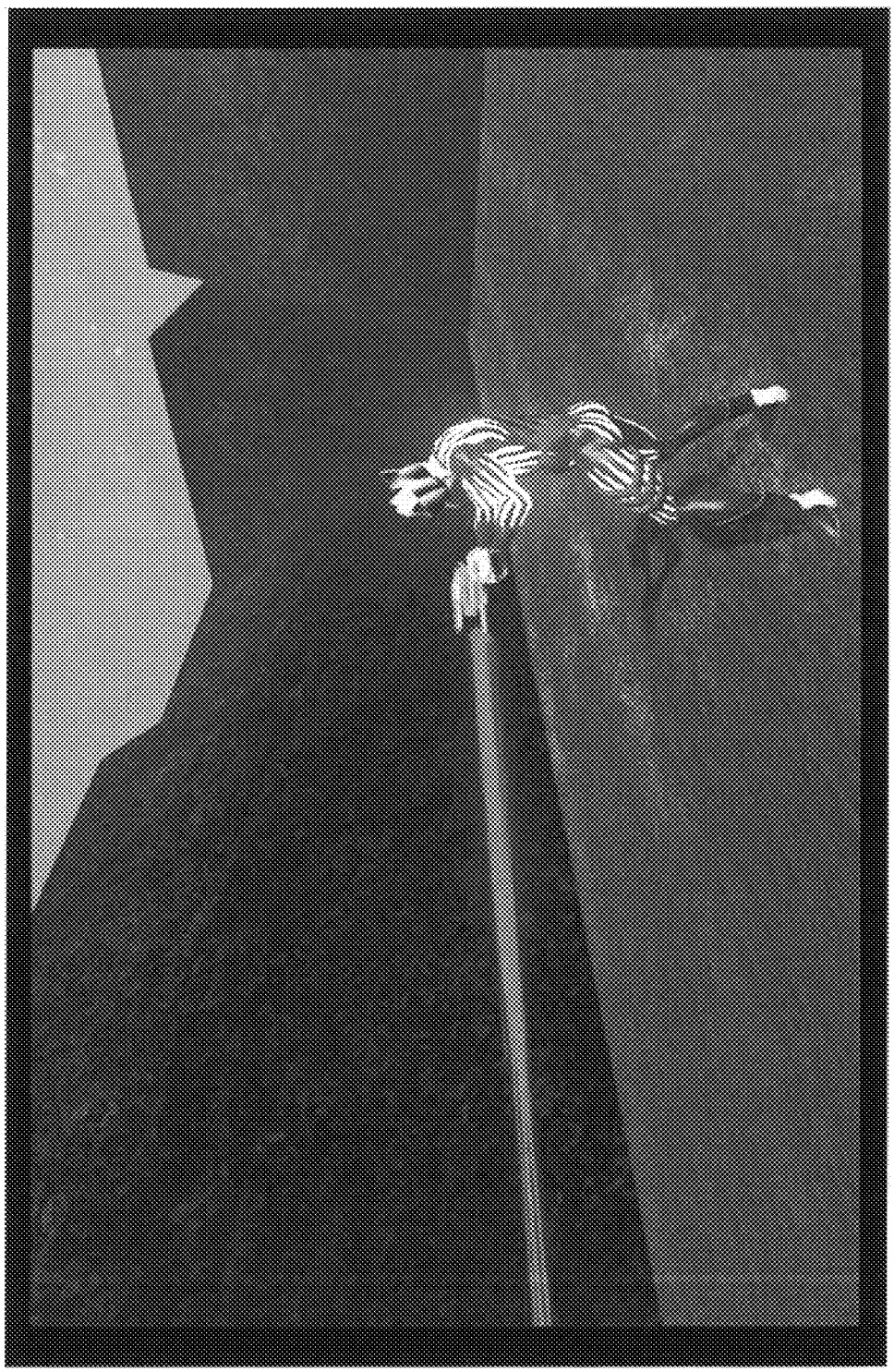

Referring to FIGS. 10A-10C, these exemplary screen shots show a pistol being fired from a first-person point of view. As can be seen by comparing FIGS. 10A-10C, as the position of the now indicator 151 varies, the projectile 1000 coming from the pistol varies. FIGS. 11A-11C show the pistol firing from a third-person point of view.

Other embodiments are within the scope and spirit of the disclosed subject matter. For example, due to the nature of software, functions described above can be implemented using software, hardware, firmware, hardwiring, or combinations of any of these. Features implementing functions can also be physically located at various positions, including being distributed such that portions of functions are implemented at different physical locations.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:

1. A non-transitory computer readable medium including computer readable instructions that, when executed by a computer, cause the computer to:
   provide a shooter combat video game having an on-screen character with a weapon situated in a virtual world, in which a player controls when the on-screen character triggers the weapon;
   provide music as the player plays the video game;
   analyze at least one of i) the music, and ii) metadata relating to the music, to determine a timing parameter related to the music; and
   cause the on-screen character to fire projectiles from the weapon, wherein firing the projectiles comprises varying a parameter of the projectiles fired from the weapon as a function of the timing parameter.

2. The non-transitory computer readable medium of claim 1, wherein:
   the instructions cause the computer to analyze by determining a trigger point; and
   the instructions cause the computer to vary the parameter of the projectiles as a function of the trigger point.

3. The non-transitory computer readable medium of claim 2, wherein:
   the instructions cause the computer to vary the parameter of the projectiles as a function of whether the player triggers the weapon at substantially the same time as the trigger point.

4. The non-transitory computer readable medium of claim 2, wherein:
   the instructions cause the computer to vary the parameter of the projectiles by modulating damage caused by the projectiles as a function of how close a triggering time is to the trigger point.

5. The non-transitory computer readable medium of claim 2, wherein the instructions are further configured to cause the computer to:
   provide a visual indicator to the player to indicate the timing of the trigger point.

6. The non-transitory computer readable medium of claim 2, wherein:
   the instructions cause the computer to analyze by determining a plurality of trigger points; and
   the instructions cause the computer to vary the parameter of the projectiles as a function of whether the player performs a plurality of actions substantially synchronously with the trigger points.

7. The non-transitory computer readable medium of claim 6, wherein the instructions cause the computer to vary the parameter of the projectiles by modifying a multiplier as a function of how many actions the player performs substantially synchronously with the trigger points.

8. The non-transitory computer readable medium of claim 6, wherein the instructions cause the computer to vary the parameter of the projectiles by causing at least one of the projectiles to track a motion of a target as long as the player performs the plurality of actions substantially synchronously with the trigger points.

9. The non-transitory computer readable medium of claim 8, wherein the instructions cause the computer to vary the parameter of the projectiles by causing the at least one of the projectiles to stop tracking the motion of the target, and to continue on a previous course, when the player stops performing actions substantially synchronously with the trigger points.

10. The non-transitory computer readable medium of claim 1, wherein:
the instructions cause the computer to analyze by determining a time of a note in the music; and
the instructions cause the computer to vary the parameter of the projectiles as a function of whether the player triggers the weapon at substantially the same time as the note.

11. The non-transitory computer readable medium of claim 1, wherein:
the instructions cause the computer to vary the parameter of the projectiles by controlling at least one of the size, color, shape, and amount of damage of the projectiles as a function of the property.

12. The non-transitory computer readable medium of claim 1, wherein:
the instructions cause the computer to analyze by determining a trigger point; and
the instructions cause the computer to vary the parameter of the projectiles by detonating at least one of the projectiles at substantially the same time as the trigger point.

13. The non-transitory computer readable medium of claim 1, wherein:
the instructions cause the computer to analyze by determining a tempo of the music; and
the instructions further cause the computer to fire projectiles at a rate corresponding to the tempo of the music.

14. The non-transitory computer readable medium of claim 1, wherein the instructions cause the computer to analyze by determining at least one of: tempo, triggering point timing, loudness, downbeat timing, pitch, frequency spectrum, timbre, and section boundary.

15. The non-transitory computer readable medium of claim 1, wherein the instructions cause the computer to vary the parameter of the projectiles as a function of the property by controlling at least one of: range, intensity, power, damage path, splash zone radius, splash zone shape, amount of damage, and splash zone orientation.

16. The non-transitory computer readable medium of claim 1, wherein the instructions cause the computer to vary the parameter of the projectiles by varying a range of the projectiles.

17. The non-transitory computer readable medium of claim 1, wherein the instructions cause the computer to vary the parameter of the projectiles by varying a velocity of the projectiles.

18. The non-transitory computer readable medium of claim 1, wherein the instructions cause the computer to vary the parameter of the projectiles by varying damage caused by the projectiles.

19. The non-transitory computer readable medium of claim 1, wherein the instructions cause the computer to vary the parameter of the projectiles by varying an ability of the projectiles to penetrate solid objects situated in the virtual world.

20. A computerized method for use with a game console, the method comprising:
providing, using the game console, a shooter combat video game having an on-screen character with a weapon situated in a virtual world, in which a player controls when the on-screen character triggers the weapon;
providing, using the game console and an audiovisual system, music as the player plays the video game;
analyzing, using the game console, at least one of i) the music, and ii) metadata relating to the music, to determine a timing parameter related to the music; and
causing the on-screen character to fire projectiles from the weapon, wherein firing the projectiles comprises varying a parameter of the projectiles fired from the weapon as a function of the timing parameter.

21. The computerized method of claim 20 wherein:
analyzing includes determining a trigger point using the game console; and
varying the parameter of the projectiles includes varying the parameter as a function of the trigger point.

22. The computerized method of claim 21 wherein varying the parameter of the projectiles includes modulating damage caused by the projectiles as a function of how close a triggering time is to the trigger point.

23. The computerized method of claim 21 further comprising providing a visual indicator to the player to indicate the timing of the trigger point.

24. The computerized method of claim 20 wherein varying the parameter of the projectiles varying the parameter as a function of whether the player triggers the weapon at substantially the same time as the trigger point.

25. The computerized method of claim 20 wherein:
analyzing includes determining a plurality of trigger points; and
varying the parameter of the projectiles varying the parameter as a function of whether the player performs a plurality of actions substantially synchronously with the trigger points.

26. The computerized method of claim 25 wherein varying the parameter of the projectiles includes modifying a multiplier as a function of how many actions the player performs substantially synchronously with the trigger points.

27. The computerized method of claim 25, wherein varying the parameter of the projectiles includes causing at least one of the projectiles to track a motion of a target as long as the player performs the plurality of actions substantially synchronously with the trigger points.

28. The computerized method of claim 27, wherein varying the parameter of the projectiles includes causing the at least one of the projectiles to stop tracking the motion of the target, and to continue on a previous course, when the player stops performing actions substantially synchronously with the trigger points.

29. The computerized method of claim 20 wherein:
analyzing includes determining a time of a note in the music using the game console; and
varying the parameter of the projectiles includes varying the parameter as a function of whether the player triggers the weapon at substantially the same time as the note.

30. The computerized method of claim 20 wherein varying the parameter of the projectiles includes controlling at least one of the size, color, shape, and amount of damage of the projectiles as a function of the property.

31. The computerized method of claim 20 wherein:
analyzing includes determining a trigger point; and
varying the parameter of the projectiles includes detonating at least one of the projectiles at substantially the same time as the trigger point.

32. The computerized method of claim 20 wherein:
analyzing includes determining a tempo of the music; and controlling the operation of the weapon to fire projectiles at a rate corresponding to the tempo of the music.

33. The computerized method of claim 20 wherein analyzing includes determining at least one of: tempo, triggering point timing, loudness, downbeat timing, pitch, frequency spectrum, timbre, and section boundary.

34. The computerized method of claim 20 wherein varying the parameter of the projectiles as a function of the property includes controlling at least one of: range, intensity, power, damage path, splash zone radius, splash zone shape, amount of damage, and splash zone orientation.

35. The computerized method of claim 20, wherein varying the parameter of the projectiles includes varying a range of the projectiles.

36. The computerized method of claim 20, wherein varying the parameter of the projectiles includes varying a velocity of the projectiles.

37. The computerized method of claim 20, wherein varying the parameter of the projectiles includes varying damage caused by the projectiles.

38. The computerized method of claim 20, wherein varying the parameter of the projectiles includes varying an ability of the projectiles to penetrate solid objects situated in the virtual world.

* * * * *